United States Patent
Alsayed et al.

(10) Patent No.: US 10,130,992 B2
(45) Date of Patent: *Nov. 20, 2018

(54) PROCESSES FOR MAKING SILVER NANOSTRUCTURES

(71) Applicant: RHODIA OPERATIONS, Paris (FR)

(72) Inventors: Ahmed Alsayed, Cherry Hill, NJ (US); Adham Ahmed, Cherry Hill, NJ (US); Chantal Badre, Millstone, NJ (US); Lawrence Alan Hough, Philadelphia, PA (US); Celine Anna Simone Burel, Ploufragan (FR)

(73) Assignee: RHODIA OPERATIONS, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/109,257

(22) PCT Filed: Dec. 15, 2014

(86) PCT No.: PCT/US2014/070312
§ 371 (c)(1),
(2) Date: Jun. 30, 2016

(87) PCT Pub. No.: WO2015/102863
PCT Pub. Date: Jul. 9, 2015

(65) Prior Publication Data
US 2016/0325352 A1    Nov. 10, 2016

Related U.S. Application Data

(60) Provisional application No. 61/922,240, filed on Dec. 31, 2013, provisional application No. 62/000,148, filed on May 19, 2014.

(51) Int. Cl.

| | | |
|---|---|---|
| *B05D 5/12* | (2006.01) | |
| *B22F 1/00* | (2006.01) | |
| *C08F 226/10* | (2006.01) | |
| *B22F 9/24* | (2006.01) | |
| *B82Y 30/00* | (2011.01) | |
| *B82Y 40/00* | (2011.01) | |
| *C09D 5/24* | (2006.01) | |
| *H01B 1/02* | (2006.01) | |
| *B22F 9/16* | (2006.01) | |

(52) U.S. Cl.
CPC .............. *B22F 1/0022* (2013.01); *B22F 9/24* (2013.01); *B82Y 30/00* (2013.01); *B82Y 40/00* (2013.01); *C08F 226/10* (2013.01); *C09D 5/24* (2013.01); *H01B 1/02* (2013.01); *B22F 1/0025* (2013.01); *B22F 2009/165* (2013.01); *B22F 2009/245* (2013.01); *B22F 2301/255* (2013.01); *B22F 2304/05* (2013.01)

(58) Field of Classification Search
CPC ..................................................... B22F 1/0022
See application file for complete search history.

(56) References Cited

U.S. PATENT DOCUMENTS

| | | | |
|---|---|---|---|
| 7,566,360 B2 | 7/2009 | Garbar et al. | |
| 7,585,349 B2 | 9/2009 | Xia et al. | |
| 7,601,406 B2 | 10/2009 | Garbar et al. | |
| 7,736,693 B2 | 6/2010 | Garbar et al. | |
| 8,088,437 B2 | 1/2012 | Lee et al. | |
| 2005/0056118 A1 | 3/2005 | Xia et al. | |
| 2005/0214480 A1 | 9/2005 | Garbar et al. | |
| 2005/0215689 A1 | 9/2005 | Garbar et al. | |
| 2005/0238804 A1 | 10/2005 | Garbar et al. | |
| 2008/0003130 A1* | 1/2008 | Xia .................... | B22F 1/0025 420/501 |
| 2009/0282948 A1 | 11/2009 | Xia et al. | |
| 2010/0120960 A1 | 5/2010 | Lee et al. | |
| 2010/0143183 A1* | 6/2010 | Martinez Martinez ........ | B22F 1/0022 420/501 |
| 2011/0023658 A1 | 2/2011 | Wang et al. | |
| 2012/0138913 A1 | 6/2012 | Alsayed et al. | |
| 2015/0336173 A1* | 11/2015 | Kim .................... | C30B 7/14 75/370 |

FOREIGN PATENT DOCUMENTS

| | | |
|---|---|---|
| JP | 2013144822 A | 7/2013 |
| WO | 2012/078191 A1 | 6/2012 |
| WO | 2014/052887 A2 | 4/2014 |

OTHER PUBLICATIONS

Emel'Yanenko et al. "Imidazolium-based ionic liquids. 1-methyl imidazolium nitrate: thermochemical measurements and ab initio calculations" (2009).*

* cited by examiner

*Primary Examiner* — Austin Murata

(57) ABSTRACT

The present invention is directed to a process for making silver nanostructures, comprising reacting at least one polyol and at least one silver compound that is capable of producing silver metal when reduced, in the presence of a source of chloride or bromide ions, at least one copolymer, and at least one acid scavenger. The present invention is also directed to silver nanostructures made by the processes described herein.

18 Claims, 29 Drawing Sheets

PROCESSES FOR MAKING SILVER NANOSTRUCTURES

CROSS-REFERENCE TO RELATED APPLICATIONS

This application is a U.S. national phase entry under 35 U.S.C. § 371 of International Application No. PCT/US2014/070312, filed on Dec. 15, 2014, which claims the priority of U.S. Provisional Applications No. 62/000,148 filed May 19, 2014 and 61/922,240 filed Dec. 31, 2013. The entire contents of these applications are herein incorporated by reference for all purposes.

FIELD OF THE INVENTION

The present invention relates to improved processes for making silver nanostructures.

BACKGROUND

Transparent conductors, such as Indium Tin Oxide (ITO), combine the electrical conductivity of metal with the optical transparency of glass and are useful as components in electronic devices, such as in display devices. Flexibility is likely to become a broader challenge for ITO, which does not seem well suited to the next generation of display, lighting, or photovoltaic devices. These concerns have motivated a search for replacements using conventional materials and nanomaterials. There is variety of technical approaches for developing ITO substitutes and there are four areas in which the alternative compete: price, electrical conductivity, optical transparency, and physical resiliency.

Electrically conductive polymers, such as polythiophene polymers, particularly a polymer blend of poly(3,4-ethylenedioxythiophene) and poly(styrene sulfonate) ("PEDOT-PSS") have been investigated as possible alternatives to ITO. The electrical conductivity of electrically conductive polymers is typically lower than that of ITO, but can be enhanced through the use of conductive fillers and dopants.

Processes for making electrically conductive metal nanostructures are known. Ducamp-Sanguesa, et. al., *Synthesis and Characterization of Fine and Monodisperse Silver Particles of Uniform Shape*, Journal of Solid State Chemistry 100, 272-280 (1992) and U.S. Pat. No. 7,585,349, issued Sep. 8, 2009, to Younan Xia, et. al., each describe synthesis of silver nanowires by reduction of a silver compound in a glycol in the presence of polyvinylpyrrolidone.

Structures comprising a network of silver nanowires encapsulated in an electrically conductive polymer have been described. U.S. Patent Application Publication No. 2008/0259262 describes forming such structures by depositing a network of metal nanowires on a substrate and then forming a conductive polymeric film in situ, e.g., by electrochemical polymerization using the metal nanowire network as an electrode. U.S. Patent Application Publication No. 2009/0129004 describes forming such structures by filtration of a silver nanowire dispersion to form a silver nanowire network, heat treating the network, transfer printing the heat treated network, and encapsulating the transfer printed network with polymer.

The performance of such electrically conductive polymer or silver nanowire composite films is, in some cases, comparable to that of ITO but the processing required to obtain composite films that exhibit that level of performance is quite demanding, for example, the above described films require processing steps, such as thermal treatment and compression, in order to ensure that sufficient electrical connections are made among the electrically conductive nanowires of the composite film to provide a film having high conductivity and transparency.

SUMMARY OF THE INVENTION

In a first aspect, the present invention is directed to a process for making silver nanostructures, comprising reacting at least one polyol and at least one silver compound that is capable of producing silver metal when reduced, in the presence of:
(a) a source of chloride or bromide ions, and
(b) at least one copolymer that comprises:
  (i) one or more first constitutional repeating units that each independently comprise at least one pendant saturated or unsaturated, five-, six-, or seven-membered, acylamino- or diacylamino-containing heterocylic ring moiety per constitutional repeating unit, and
  (ii) one or more second constitutional repeating units, each of which independently differs from the one or more first nonionic constitutional repeating units,
  and has a molecular weight of greater than or equal to about 500 grams per mole; and
(c) at least one acid scavenger.

In a second aspect, the present invention is directed to silver nanostructures made by the processes described herein.

In a third aspect, the present invention is directed to a dispersion comprising:
(A) silver nanostructures made according to the processes described herein; and
(B) a liquid medium;
wherein the liquid medium comprises water, a ($C_1$-$C_6$) alkanol, or a mixture thereof.

In a fourth aspect, the present invention is directed to an electrically conductive coating made according to a process comprising the steps of:
(A) depositing on a substrate a layer of a dispersion, and
(B) removing the liquid medium from the layer.

DETAILED DESCRIPTION OF THE INVENTION

Figure 1:
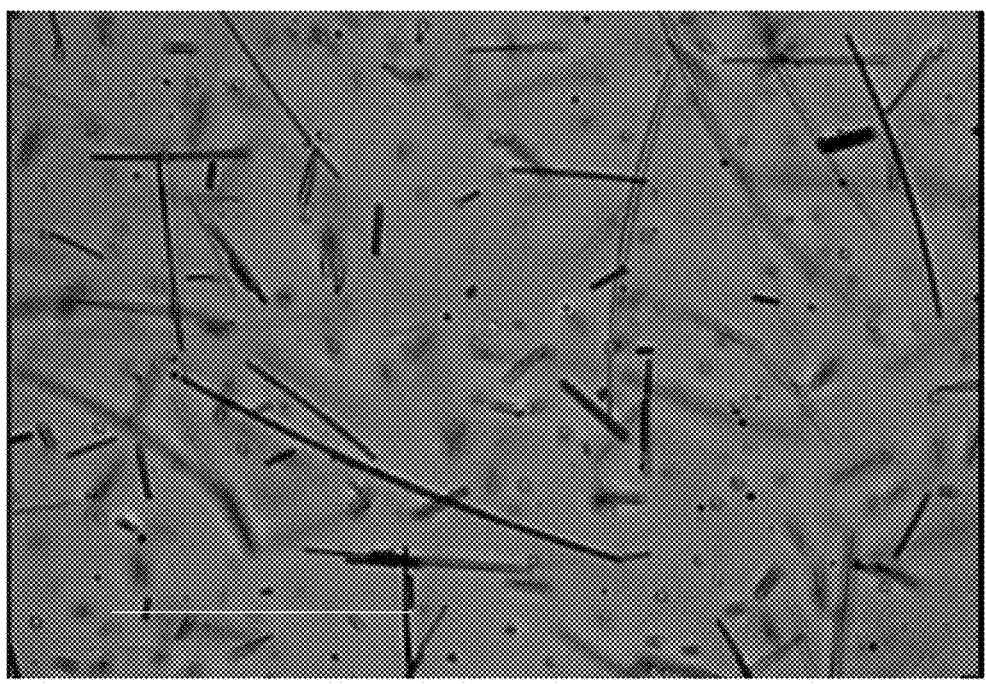
FIG. 1: An optical microscope image of silver nanowires formed by the process of the present invention as illustrated in Example 1.

As used herein, the following terms have the following meanings:

"doped" as used herein in reference to an electrically conductive polymer means that the electrically conductive polymer has been combined with a polymeric counterion for the electrically conductive polymer, which polymeric counterion is referred to herein as "dopant", and is typically a polymeric acid, which is referred to herein as a "polymeric acid dopant", "doped electrically conductive polymer" means a polymer blend comprising an electrically conductive polymer and a polymeric counterion for the electrically conductive polymer, "electrically conductive polymer" means any polymer or polymer blend that is inherently or intrinsically, without the addition of electrically conductive fillers such as carbon black or conductive metal particles, capable of electrical conductivity, more typically to any polymer or oligomer that exhibits a bulk specific conductance of greater than or equal to $10^{-7}$ Siemens per centimeter ("S/cm"), unless otherwise indicated, a reference herein to an "electrically conductive polymer" include any optional polymeric acid dopant, "electrically conductive" includes conductive and semi-conductive, "electronic device" means a device that comprises one or more layers comprising one or more semiconductor materials and makes use of the controlled motion of electrons through the one or more layers, "layer" as used herein in reference to an electronic device, means a coating covering a desired area of the device, wherein the area is not limited by size, that is, the area covered by the layer can, for example, be as large as an entire device, be as large as a specific functional area of the device, such as the actual visual display, or be as small as a single sub-pixel.

As used herein, the following terms have the following meanings:

"alkyl" means a monovalent straight, branched or cyclic saturated hydrocarbon radical, more typically, a monovalent straight or branched saturated $(C_1-C_{40})$hydrocarbon radical, such as, for example, methyl, ethyl, n-propyl, isopropyl, n-butyl, isobutyl, tert-butyl, hexyl, octyl, hexadecyl, octadecyl, eicosyl, behenyl, tricontyl, and tetracontyl, "cycloalkyl" means a saturated hydrocarbon radical, more typically a saturated $(C_5-C_{22})$ hydrocarbon radical, that includes one or more cyclic alkyl rings, which may optionally be substituted on one or more carbon atoms of the ring with one or two $(C_1-C_6)$alkyl groups per carbon atom, such as, for example, cyclopentyl, cycloheptyl, cyclooctyl, "heteroalkyl" means an alkyl group wherein one or more of the carbon atoms within the alkyl group has been replaced by a hetero atom, such as nitrogen, oxygen, or sulfur, "heterocyclic" means an cyclic hydrocarbon group in which one or more of the ring carbon atoms has been replaced by a hetero atom, such as nitrogen, oxygen, or sulfur, "alkylene" refers to a divalent alkyl group including, for example, methylene, and poly(methylene), "alkenyl" means an unsaturated straight or branched hydrocarbon radical, more typically an unsaturated straight, branched, $(C_2-C_{22})$ hydrocarbon radical, that contains one or more carbon-carbon double bonds, including, for example, ethenyl, n-propenyl, and iso-propenyl, "aryl" means an unsaturated hydrocarbon radical that contains one or more six-membered carbon rings in which the unsaturation may be represented by three conjugated carbon-carbon double bonds, wherein one or more of the ring carbons may be substituted with one or more hydroxy, alkyl, alkenyl, alkoxy, halo, or alkylhalo substituents, such as, for example, phenyl, methylphenyl, trimethylphenyl, nonylphenyl, chlorophenyl, trichloromethylphenyl, naphthyl, and anthryl, and "aralkyl" means an alkyl group substituted with one or more aryl groups, more typically a $(C_1-C_{18})$alkyl substituted with one or more ($C_6$-$C_{14}$)aryl substituents, such as, for example, phenylmethyl, phenylethyl, and triphenylmethyl, and "($C_x$-$C_y$)" in reference to an organic group, wherein x and y are each integers, means that the group may contain from x carbon atoms to y carbon atoms per group.

Addition of the prefix "(meth)" to a group name, such as "acrylate", "acrylic", "acrylamide", "acrylamido", or "allyl" to form terms such as "(meth)acrylate, "(meth)acrylic", "(meth)acrylamide, "(meth)acrylamido", and "(meth)allyl" is used herein to indicate the methyl-susbitituted and/or the non-methyl-substituted homologs of such groups. For example, the term "ethyl (meth)acrylate", as used herein means ethyl acrylate, ethyl methacrylate, or a mixture thereof.

As used herein in reference to an organic or inorganic moiety, the following terms have the following meanings:

"cationic" means that the moiety carries a net positive electrical charge,

"anionic" means that the moiety carries a net negative electrical charge,

"amphoteric" and "zwitterionic" mean that the moiety has no net electrical charge, but carries, or under certain pH conditions, may carry both a localized negative electrical charge and a localized positive electrical charge, and "nonionic" means that the moiety is carries no net electrical charge no localized negative electrical charge and no localized positive electrical charge.

As used herein in reference to a polymer or copolymer molecule, the following terms have the following meanings:

"constitutional repeating unit" means the smallest constitutional unit, the repetition of which constitutes a chain or a block of the polymer or copolymer molecule, "constitutional unit" means an atom or group of atoms, including pendant atoms or groups, if any, comprising a part of the essential structure of the polymer or copolymer molecule or of a block or chain of the polymer or copolymer molecule, "chain" means the whole or a portion of the polymer or copolymer molecule, comprising a linear or branched sequence of one or more constitutional units between two boundary constitutional units, each of which may be either an end-group, a branch point or an otherwise-designated characteristic feature of the polymer or copolymer molecule, and "block" means, in reference to a copolymer, a portion of the copolymer, comprising two or more constitutional units that has at least one feature which is not present in the adjacent portions of the copolymer.

The dimensions referred to herein in regard to bulk nanostructure materials are averaged dimensions obtained by sampling individual nanostructures contained in the bulk material wherein the lengths are obtained using optical microscopy, and the diameters are determined using electron microscopy, such as, for example, transmission electron microscopy (TEM) and scanning electron microscopy (SEM). Using this process, a sample of about 150 nanostructures are measured to determine the lengths, and a sample of about 100 nanostructures are measured to determine the diameters. An average diameter, average length, and average aspect ratio are then determined for the nanostructures examined as follows. Unless otherwise indicated, nanostructure dimensions are given as arithmetic averages of the measured nanowire population. In the case of anisotropic nanostructures, such as nanowires, lengths may also be given as length weighted average lengths, as determined by first taking the length of each nanowire and dividing it by the sum of the lengths of all nanowires measured to derive a quantity $W_1$, which is the percent contribution of the single nanowire to the sum length of all nanowires, then, for each of the measured nanowires, deriving a weighted length by multiplying the length of the nanowire by its respective $W_1$ value, and finally taking the arithmetic average of the weighted lengths of the measured nanowires to derive the length weighted average length of the nanowire population. Aspect ratios of anisotropic nanostructures are determined by dividing the length weighted average length of the nanowire population by the average diameter of the anisotropic nanostructure population. The length and diameter distribution of the nanostructures produced by the processes described herein may be determined using the image analysis software "ImageJ" on pictures taken with an optical microscope.

As used herein, the term "nanostructures" generally refers to nano-sized structures, at least one dimension of which is less than or equal to 2000 nm, more typically less than or equal to 500 nm, even more typically, less than or equal to 250 nm, or less than or equal to 100 nm, or less than or equal to 50 nm, or less than or equal to 25 nm. The anisotropic electrically conductive nanostructures can be of any anisotropic shape or geometry. As used herein, the terminology "aspect ratio" in reference to a structure means the ratio of the structure's longest characteristic dimension to the structure's next longest characteristic dimension. In one embodiment, the anisotropic electrically conductive nanostructures have an elongated shape with a longest characteristic dimension, i.e., a length, and a next longest characteristic dimension, i.e., a width or diameter, with an aspect ratio of greater than 1.

The at least one polyol serves as liquid medium in which to conduct the reaction and as a reducing agent that reduces the silver compound to silver metal. Suitable polyols are organic compounds having a core moiety comprising at least 2 carbon atoms, which may optionally further comprise one or more heteroatoms selected from N and O, wherein the core moiety is substituted with at least 2 hydroxyl groups per molecule and each hydroxyl group is attached to a different carbon atom of the core moiety. Suitable polyols are known and include, for example, alkylene glycols, such as ethylene glycol, propylene glycols, and butanediols, alkylene oxide oligomers, such as diethylene glycol, triethylene glycol, tetraethylene glycol, dipropylene glycol, and polyalkylene glycols, such as polyethylene glycol and polypropylene glycol, provided that such polyalkylene glycol is liquid at the reaction temperature, triols, such as, for example, glycerol, trimethylolpropane, triethanolamine, and trihydroxymethylaminomethane, and compounds having more than 3 hydroxyl groups per molecule, as well as mixtures of two or more of any of such compounds. In one embodiment, the polyol comprises ethylene glycol. In another embodiment, the polyol comprises glycerol.

Typically, the at least one polyol is distilled prior to reacting the at least one polyol and the at least one silver compound. Any method of distillation known in the art may be used to distill the at least one polyol. Examples of suitable distillation methods include, but are not limited to, simple distillation, fractional distillation, and vacuum distillation. In one embodiment, the at least one polyol is distilled by simple distillation.

The at least one polyol may also be recycled. That is, unreacted polyol may be recovered from the reaction and reused in another iteration of the reaction without diminution of the quality of silver nanostructures formed. It is believed that many soluble organic by-products are formed in the reaction that would contaminate and hinder the reuse of the polyol. However, it was surprisingly found that the polyol may be purified in a facile manner, for example, by distillation, prior to use in another iteration of the reaction without diminishing the quality of the silver nanostructures formed.

Suitable silver compounds that are capable of producing silver metal when reduced are known and include silver oxide, silver hydroxide, organic silver salts, and inorganic silver salts, such as silver nitrate, silver nitrite, silver sulfate, silver halides such as silver chloride, silver carbonates, silver phosphate, silver tetrafluoroborate, silver sulfonate, silver carboxylates, such as, for example, silver formate, silver acetate, silver propionate, silver butanoate, silver trifluoroacetate, silver acetacetonate, silver lactate, silver citrate, silver glycolate, silver tosylate, silver tris(dimethylpyrazole)borate, as well as mixtures of two or more of such compounds. In one embodiment, the silver compound capable of producing silver metal when reduced comprises silver nitrate ($AgNO_3$).

Suitable sources of chloride and/or bromide ions include hydrochloric acid, chloride salts, such as ammonium chloride, calcium chloride, ferric chloride, lithium chloride, potassium chloride, sodium chloride, triethylbenzyl ammonium chloride, tetrabutyl ammonium chloride, hydrobromic acid, and bromide salts, such as ammonium bromide, calcium bromide, ferric bromide, lithium bromide, potassium bromide, sodium bromide, triethylbenzyl ammonium bromide, tetrabutyl ammonium bromide, or, in a case wherein the copolymer comprises a chloride or bromide counterion, the chloride or bromide counterion of the copolymer. In one embodiment, the source of chloride ions comprises lithium chloride.

In one embodiment, the source of bromide ions comprises potassium bromide.

In one embodiment, the source of chloride or bromide ions comprises silver chloride and/or silver bromide, which may be added to the reaction mixture in the form of colloidal particles. The colloidal particles of silver chloride and/or silver bromide may have a particle size of from about 10 nm to about 10 µm, more typically of from about 50 nm to about 10 µm.

The pH of the at least one polyol may be any pH at room temperature (25° C.). The pH of the at least one polyol may be determined by conventional analytical methods known in the art, including, for example, colorimetric titration, potentiometric titration, direct measurement using a pH meter, and the like. Typically, the pH of the at least one polyol is from about 1 to about 14. More typically, the pH of the at least one polyol is from about 5 to about 12. Even more typically, the pH of the at least one polyol is from about 7 to about 10.

The acid scavenger is any substance capable of bonding to or sequestering $H^+$ (hydronium) ions. Acid scavengers include, for example, bases, buffering agents, and mixtures thereof.

Typically, bases include, for example, sources of hydroxide ($OH^-$) ions, sources of sulfide ($S^{2-}$) ions, and mixtures thereof. Suitable sources of hydroxide ions include, for example, alkali metal hydroxides, alkaline earth metal hydroxides, and mixtures thereof. Suitable alkali metal hydroxides include, but are not limited to, LiOH, NaOH, KOH, RbOH, and CsOH. Suitable alkaline earth metal hydroxides include, but are not limited to, $Mg(OH)_2$, $Ca(OH)_2$, $Sr(OH)_2$, and $Ba(OH)_2$. Suitable sources of sulfide ions include, but are not limited to, alkali metal sulfides, alkaline earth metal sulfides, and mixture thereof. Suitable alkali metal sulfides include, but are not limited to, $Li_2S$, $Na_2S$, $K_2S$, $Rb_2S$, and $Cs_2S$. Suitable alkaline earth metal sulfides include, but are not limited to, MgS, CaS, SrS, and BaS. In one embodiment, the acid scavenger comprises $Ca(OH)_2$. In one embodiment, the acid scavenger comprises $Ca(OH)_2$ and $Na_2S$.

Suitable buffering agents include, but are not limited to, 2-(N-morpholino)ethanesulfonic acid (MES), 2,2-bis(hydroxymethyl)-2,2',2''-nitrilotriethanol (Bis-Tris), N-(2-acetamido)iminodiacetic acid (ADA), N-(2-acetamido)-2-aminoethanesulfonic acid (ACES), 1,4-piperazinediethanesulfonic acid (PIPES), β-Hydroxy-4-morpholinepropanesulfonic acid (MOPSO), 1,3-bis[tris(hydroxymethyl)methylamino]propane (Bis-Tris Propane), N,N-bis(2-hydroxyethyl)-2-aminoethanesulfonic acid (BES), 3-(N-morpholino)propanesulfonic acid (MOPS), 2-[(2-hydroxy-1,1-bis(hydroxymethyl)ethyl)amino]ethanesulfonic acid (TES), 4-(2-hydroxyethyl)piperazine-1-ethanesulfonic acid (HEPES), 3-(N,N-bis[2-hydroxyethyl]amino)-2-hydroxypropanesulfonic acid (DIPSO), 4-(N-morpholino)butanesulfonic acid (MOBS), 2-hydroxy-3-[tris(hydroxymethyl)methylamino]-1-propanesulfonic acid (TAPSO), 2-amino-2-(hydroxymethyl)-1,3-propanediol (Trizma), 4-(2-hydroxyethyl)piperazine-1-(2-hydroxypropanesulfonic acid) (HEPPSO), piperazine-1,4-bis(2-hydroxypropanesulfonic acid) (POPSO), triethylamine (TEA), 4-(2-hydroxyethyl)-1-piperazinepropanesulfonic acid (EPPS), N-[tris(hydroxymethyl)methyl]glycine (tricine), diglycine (Gly-Gly), N,N-bis(2-hydroxyethyl)glycine (bicine), N-(2-hydroxyethyl)piperazine-N'-(4-butanesulfonic acid) (HEPBS), N-[tris(hydroxymethyl)methyl]-3-aminopropanesulfonic acid (TAPS), 2-amino-2-methyl-1,3-propanediol (AMPD), N-tris(hydroxymethyl)methyl-4-aminobutanesulfonic acid (TABS), N-(1,1-dimethyl-2-hydroxyethyl)-3-amino-2-hydroxypropanesulfonic acid (AMPSO), 2-(cyclohexylamino)ethanesulfonic acid (CHES), 3-(cyclohexylamino)-2-hydroxy-1-propanesulfonic acid (CAPSO), 2-amino-2-methyl-1-propanol (AMP), 3-(cyclohexylamino)-1-propanesulfonic acid (CAPS), 4-(cyclohexylamino)-1-butanesulfonic acid (CABS), salts thereof, and mixtures thereof. In one embodiment, the acid scavenger comprises bicine.

In one embodiment, the acid scavenger comprises a base and no buffering agent. In one embodiment, the acid scavenger comprises an alkaline earth metal hydroxide, an alkali metal sulfide, alkaline earth metal sulfide, or a mixture thereof. In one embodiment, the acid scavenger comprises a buffering agent and no base. In one embodiment, the acid scavenger comprises a buffering agent and a base. In one embodiment, the acid scavenger comprises a buffering agent and an alkaline earth metal hydroxide, an alkali metal sulfide, alkaline earth metal sulfide, or a mixture thereof. In one embodiment, the acid scavenger comprises LiOH and bicine. Typically, the amount of base is from about 0 parts by weight to about 100 parts by weight, and the amount of buffering agent is from 100 parts by weight to about 0 parts by weight, based on 100 parts by weight of the acid scavenger.

The amount of the at least one acid scavenger is from about $5.0 \times 10^{-5}$ to about $5.0 \times 10^{-2}$ pbw of the at least one acid scavenger per 1 pbw of the total amount of the at least one polyol used in the reaction. Typically, the amount of the at least one acid scavenger is from about $5.0 \times 10^{-5}$ to about $5.0 \times 10^{-3}$ pbw of the at least one acid scavenger per 1 pbw of the total amount of the at least one polyol used in the reaction.

The amount of the at least one acid scavenger is typically from about $5.0 \times 10^{-5}$ to about $5.0 \times 10^{-4}$ pbw of the at least one base per 1 pbw of the total amount of the at least one polyol used in the reaction. More typically, the amount of the at least one base is typically from about $1.0 \times 10^{-4}$ to about $4.5 \times 10^{-4}$ pbw of the at least one base per 1 pbw of the total amount of the at least one polyol used in the reaction.

The total amount of silver compound added to the reaction mixture over the entire course of the reaction, based on one liter of reaction mixture, is typically from about $1.5 \times 10^{-3}$ mole to about 1 mole of the silver compound (corresponding, in the case of $AgNO_3$ as the silver compound and ethylene glycol as the polyol, to about 0.026 wt % to about 17 wt % $AgNO_3$ in ethylene glycol), more typically from greater than or equal to $3 \times 10^{-2}$ mole to about 1 mole of the silver compound (corresponding, in the case of $AgNO_3$ as the silver compound and ethylene glycol as the polyol, to about 0.51 wt % to about 17 wt % $AgNO_3$ in ethylene glycol). The silver compound may be introduced to the reaction mixture as a solid powder, the total amount of which may be introduced at one time or which may introduced in a series of portion of the total amount. Alternatively, the silver compound may be fed to the reaction mixture as a dilute solution of the silver compound in the polyol comprising from about 10 g to about 100 g of the silver compound per 1000 g polyol at a rate that is sufficiently slow as to avoid reducing the temperature of the reaction mixture.

In one embodiment, the total amount of silver compound added to the reaction mixture is, based on one Liter of reaction mixture, typically from about 0.02 moles to about 0.22 moles (corresponding, in the case of $AgNO_3$ as the silver compound and ethylene glycol as the polyol, to from about 0.3 wt % to about 3.75 wt % $AgNO_3$ in ethylene glycol), more typically from about 0.06 moles to about 0.18 moles (corresponding, in the case of $AgNO_3$ as the silver compound and ethylene glycol as the polyol, to from about 1 wt % to 3 wt % $AgNO_3$ in ethylene glycol), even more typically from about 0.07 moles to about 0.18 moles (corresponding, in the case of $AgNO_3$ as the silver compound and ethylene glycol as the polyol, to from about 1.25 wt % to about 3 wt % $AgNO_3$ in ethylene glycol). In one embodiment, the total amount of silver compound added to the reaction mixture is, based on one Liter of reaction mixture, from greater than 0.1 moles to about 0.22 moles (corresponding, in the case of $AgNO_3$ as the silver compound and ethylene glycol as the polyol, to from about 1.7 wt % to about 3.75 wt % $AgNO_3$ in ethylene glycol).

In one embodiment, the nanostructures are made in the presence of from about $5.4 \times 10^{-5}$ moles to about $5.4 \times 10^{-3}$ moles of particles of silver chloride and/or particles of silver bromide per Liter of reaction mixture. While not wishing to be bound by theory, it is believed that the particles of silver chloride and/or particles of silver bromide catalyze growth of the silver nanostructures, but do not participate as a reactive "seeds" that become incorporated within the silver nanostructures.

In one embodiment, the at least one polyol and at least one silver compound are reacted at a temperature of from about 100° C. to about 210° C., more typically from about 130 to about 185° C.

In one embodiment, at least a portion of the polyol is preheated to a temperature of from about 100° C. to about 210° C., more typically from about 130° C. to about 185° C., typically for a period of greater than about 1 minute, more typically for a period of greater than about 5 minutes prior to introduction of the source of chloride or bromide ions, and/or the silver compound.

In one embodiment, at least a portion of the polyol is preheated to a temperature of from about 105° C. to about 170° C.

In one embodiment, particles of silver chloride or silver bromide are formed in the polyol in a preliminary step, wherein a silver compound and polyol are reacted in the presence of a source of chloride or bromide ions, typically with the silver compound in an excess of from greater than 1, more typically from about 1.01 to about 1.2 moles, of silver compound per mole chloride or bromide ions. In one embodiment, from about $5.4 \times 10^{-5}$ to about $5.4 \times 10^{-4}$ moles silver compound per liter of reaction mixture are reacted in the presence of from about $5.4 \times 10^{-5}$ to about $5.4 \times 10^{-4}$ moles of the source of chloride and/or bromide ions per liter of reaction mixture to form silver chloride and/or silver bromide seed particles in the reaction mixture. In one embodiment particles of silver chloride or silver bromide are formed at a temperature of from about 100° C. to about 210° C., more typically from about 130° C. to about 185° C. The formation of the silver chloride or silver bromide particles is typically conducted over a time period of greater than or equal to about 1 minute, more typically of from about 1 minute to about 10 minutes.

In an embodiment, formation of the particles of silver chloride or silver bromide particles is conducted at a temperature of about 105° C. to about 170° C.

In one embodiment from about $1.5 \times 10^{-3}$ to about 1 mole of the silver compound per Liter of reaction mixture are added in a second reaction step. The growth step is conducted at a temperature of about 100° C. to about 210° C., more typically from about 130° C. to about 185° C. The second reaction step of the reaction is typically conducted over a time period of greater than or equal to about 5 minutes, more typically from about 5 minutes to about 4 hours, and even more typically from about 10 minutes to 1 about hour.

In an embodiment, the growth step (feed step) is conducted at a temperature of about 105° C. to about 170° C.

Agitation may be used throughout the entire duration of the reaction, or for only a portion of the reaction. The reaction may also be completely conducted without agitation. When agitation is used, the agitation speed is typically about 100 rpm to about 300 rpm. Surprisingly, it has been found that the presence or absence of agitation changes the morphology of the silver nanostructures that are formed. In an embodiment, agitation is stopped following the feed step.

In one embodiment, particles of silver chloride or silver bromide are formed in the polyol simultaneously with the formation of the silver nanostructures in a single step, wherein a silver compound and polyol are reacted in the presence of a source of chloride or bromide ions, typically with the silver compound in very large molar excess. The single step formation reaction is conducted at a temperature of from about 100° C. to about 210° C., more typically from about 130° C. to about 185° C. The single step formation reaction is typically conducted over a time period of greater than or equal to about 5 minutes, more typically from about 5 minutes to about 4 hours, and even more typically from about 10 minutes to about 1 hour.

In one embodiment, a reaction mixture comprising the polyol and source of chloride or bromide ions is heated to a first temperature, typically from about 130° C. to about 155° C., which is maintained for about 10 to 30 minutes, typically 15 to 25 minutes. The silver compound is subsequently added to the reaction mixture. The temperature of the reaction mixture is then changed to a second temperature, typically from about 160° C. to about 185° C., according to a ramping rate. The ramping rate is expressed as temperature change per minute and is typically about 0.5° C./min to about 10° C./min, more typically 2° C./min to 5° C./min.

In one embodiment, the process comprises:
(1) heating to a first temperature a mixture comprising
   (a) at least one polyol;
   (b) a source of chloride or bromide ions;
   (c) at least one copolymer that comprises:
      (i) one or more first constitutional repeating units that each independently comprise at least one pendant saturated or unsaturated, five-, six-, or seven-membered, acylamino- or diacylamino-containing heterocylic ring moiety per constitutional repeating unit, and
      (ii) one or more second constitutional repeating units, each of which independently differs from the one or more first nonionic constitutional repeating units, and has a molecular weight of greater than or equal to about 500 grams per mole, and
(2) adding to the mixture of step (1) at least one silver compound that is capable of producing silver metal when reduced; and
(3) heating to a second temperature the mixture obtained in step (2); thereby making silver nanostructures.

In one embodiment, the process comprises:
(1) heating to a first temperature a mixture comprising
   (a) at least one polyol;
   (b) a source of chloride or bromide ions;
   (c) at least one copolymer that comprises:
      (i) one or more first constitutional repeating units that each independently comprise at least one pendant saturated or unsaturated, five-, six-, or seven-membered, acylamino- or diacylamino-containing heterocylic ring moiety per constitutional repeating unit, and
      (ii) one or more second constitutional repeating units, each of which independently differs from the one or more first nonionic constitutional repeating units,
      and has a molecular weight of greater than or equal to about 500 grams per mole, and
   (d) at least one acid scavenger; and
(2) adding to the mixture of step (1) at least one silver compound that is capable of producing silver metal when reduced; and
(3) heating to a second temperature the mixture obtained in step (2); thereby making silver nanostructures.

The reaction may be conducted under an air atmosphere or under an inert atmosphere, such as a nitrogen or argon atmosphere. In one embodiment, the reaction is conducted under a nitrogen atmosphere.

The copolymer is believed to function as an organic protective agent. The amount of copolymer is typically from about 0.1 to about 20 parts by weight ("pbw"), more typically from about 1 to about 5 pbw, of the copolymer per 1 pbw of silver compound, based on the total amount of the silver compound added to the reaction mixture.

In one embodiment, the reaction is conducted in the presence of, based on the weight of the reaction mixture, from about 0.01 wt % to about 50 wt %, more typically from about 0.1 wt % to about 20 wt %, and even more typically from about 0.5 wt % to 8 wt %, of the copolymer.

In one embodiment, the at least one silver compound comprises silver nitrate, the at least one polyol comprises ethylene glycol or glycerol, the at least one acid scavenger comprises LiOH, $Na_2S$, $Ca(OH)_2$, bicine, or a mixture thereof, the total amount of silver nitrate added to the reaction mixture is from $1.5 \times 10^{-3}$ mole to about 1 mole silver nitrate per Liter of reaction mixture, and the reaction is conducted in the presence of, based on the weight of the reaction mixture, from about 0.01 wt % to about 50 wt %, more typically from about 0.1 wt % to about 20 wt %, and even more typically from about 0.5 wt % to 8 wt %, of the copolymer.

Saturated or unsaturated five-, six-, or seven-membered acylamino- or diacylamino-containing heterocylic ring moieties suitable as the at least one pendant group of the first constitutional repeating unit of the copolymer include, for example, pyrrolidonyl, pyrrolidinedionyl, azacyclohexanoyl, azacyclohexadionyl, azacycloheptanonyl, and azacycloheptadionyl.

In one embodiment, the first constitutional repeating units of the copolymer each independently comprise a pyrrolidonyl moiety or a pyrrolidinedionyl moiety. In one embodiment, each of the first constitutive units of the copolymer comprises a pyrrolidonyl moiety.

In one embodiment, the first constitutional repeating units each independently comprise a pendant group according to structure (I):

$$R^1-R^2— \qquad (I)$$

wherein:
$R^1$ is a saturated or unsaturated five-, six-, or seven-membered acylamino- or diacylamino-containing heterocylic ring moiety, more typically pyrrolidonyl, 2,5 pyrrolidinedionyl, azacyclohexanonyl, azacyclohexadionyl azacycloheptanonyl, azacycloheptadionyl, even more typically pyrrolidonyl or 2,5 pyrrolidinedionyl, and $R^2$ is divalent linking group, more typically a divalent linking group selected from poly(alkyleneoxy), —O—C(O)—, —NH—C(O)— and —$(CH_2)_n$—, wherein n is an integer of from 1 to 10, more typically of from 1 to 3, or is absent.

The first constitutional repeating units may be made by known synthetic techniques, such as, for example, by grafting of one or more five-, six-, or seven-membered saturated or unsaturated acylamino- or diacylamino-containing heterocylic ring moieties onto a polymer backbone, such as a hydrocarbon polymer backbone, a polyester polymer backbone, or a polysaccharide polymer backbone, or by copolymerization of a nonionic monomer, as described below, with, for example, an ionic monomer, as described below.

In one embodiment, the first constitutional repeating units of the copolymer of the present invention are derived from a first monomer comprising at least one reactive functional group and at least one five-, six-, or seven-membered saturated or unsaturated acylamino- or diacylamino-containing heterocylic ring moiety per molecule of the monomer.

Suitable reactive functional groups include, for example, hydroxyl groups, isocyanate groups, epoxide groups, amino groups, carboxylate groups, and α,β-unsaturated groups, such as —$CH_2$=$CH_2$, or —$H(CH_3)C$=$CH_2$.

In one embodiment, the first monomer comprises one or more compounds according to structure (II):

$$R^1-R^2-R^3 \qquad (II)$$

wherein:
$R^1$ and $R^2$ are as described above, and
$R^3$ is a reactive functional group, more typically a reactive group selected from —$CH_2$=$CH_2$, and —$H(CH_3)C$=$CH_2$.

In one embodiment, the first constitutional repeating units of the copolymer of the present invention are derived from a first monomer selected from vinyl pyrrolidone. vinyl caprolactam, and mixtures thereof. More typically, each of the first constitutional repeating units of the copolymer of the present invention is derived from vinylpyrrolidone.

Constitutional repeating units suitable as the second constitutional repeating units of the copolymer of the present invention may be any constitutional repeating units that differ in composition from the first constitutional repeating units.

In one embodiment, the second constitutional repeating units each comprise at least one pendant moiety per second constitutional repeating unit that: (i) is selected from ionic organic moieties and nonionic organic moieties, and (ii) is not a saturated or unsaturated, five-, six-, or seven-membered, acylamino- or diacylamino-containing heterocylic ring moiety.

In one embodiment, the second constitutional repeating units each comprise at least one pendant moiety per second constitutional repeating unit that is selected from ionic organic moieties. Suitable ionic organic moieties include cationic moieties, anionic moieties, and amphoteric/zwitterionic moieties.

In one embodiment, one or more of the second constitutional repeating units comprise at least one pendant cationic moiety.

Suitable cationic moieties include nitrogenous organic moieties that comprise a primary, secondary, or tertiary amino nitrogen atom, or a quaternary nitrogen atom. In those embodiments comprising a quaternary nitrogen atom, the, the cationic moiety is typically in the form of a salt that is associated with a counter anion, which may be selected from organic anions, such as sulphonate anions, and inorganic anions, such as halogen anions or nitrate anions. In one embodiment, one or more of the second constitutional repeating units each comprise at least one pendant cationic moiety that comprises a quaternary ammonium nitrogen atom and counter anion, more typically a chloride, bromide, or nitrate counter anion, or a mixture thereof.

In one embodiment, one or more of the second constitutional repeating units each independently comprise, per second constitutional repeating unit, selected from:

acyclic groups that comprise at least one primary, secondary, or tertiary amino nitrogen atom or quaternary nitrogen atom per group, and five or six-membered heterocylic ring-containing groups that comprise at least one nitrogen atom, which may be a quaternary nitrogen atom, as a ring member.

Five or six-membered heterocylic ring-containing groups suitable as the at least one nitrogenous cationic group of the second constitutive unit, include, for example, pyrrolidinyl, pyrrolinyl, imidazolidinyl, pyrrolyl, imidazolyl, pyrazolidinyl, pyrazolinyl, piperidinyl, piperazinyl, pyridinyl, pyrazinyl, pyrimadinyl, or pyridazinyl groups, more typically quaternized pyrrolidinyl, quaternized pyrrolinyl, quaternized imidazolidinyl, quaternized pyrrolyl, quaternized imidazolyl, quaternized pyrazolidinyl, quaternized pyrazolinyl, quaternized piperidinyl, quaternized piperazinyl, quaternized pyridinyl, quaternized pyrazinyl, quaternized pyrimadinyl, or quaternized pyridazinyl groups.

In one embodiment, one or more of the second constitutional repeating units comprise at least one pendant anionic organic moiety. Suitable anionic moieties include, for example, carboxylate, sulphonate, sulfate, phosphate, and phosphonate moieties, such as, for example, alkyl carboxylate moieties, alkyl sulphonate moieties, alkaryl sulphonate moieties, and alkyl sulfate moieties, and salts thereof. In some embodiments, the anionic moiety is in the form of a salt that is associated with a counter cation, which may be an inorganic cation or an organic cation, such as an ammonium cation, a cation comprising a primary, secondary, or tertiary amino nitrogen, a cation comprising a quaternary nitrogen atom, an alkali metal cation, or a mixture thereof.

In one embodiment, one or more of the second constitutional repeating units comprise at least one pendant amphoteric/zwitterionic organic moiety. Suitable amphoteric/zwitterionic organic moieties include, for example, moieties that comprise both a cationic group, such as a quaternary nitrogen atom, and anionic group, such as a sulphonate group or a carboxylate group, each of which may independently be in the form of a salt associated with an oppositely charged counterion, as part of the same moiety, such as, for example, sulfobetaine moieties or carboxybetaine moieties.

In one embodiment, one or more of the second constitutional repeating units each independently comprise at least one pendant nonionic organic moiety. Suitable nonionic moieties include hydrocarbyl moieties, such as alkyl, cycloalkyl, aryl, alkaryl, and aralkyl moieties, hydroxyalkyl moieties, and poly(alkylene oxide) moieties.

In one embodiment, the ionic moiety of the ionic constitutional repeating units each independently comprise an acyclic group that comprises at least one quaternized nitrogen atom, such as a moiety according to formula (III):

$$R^{20}\text{-}R^{21}\text{---} \qquad (III)$$

wherein:

$R^{20}$ is an ionic organic moiety or a nonionic organic moiety that is not a saturated or unsaturated, five-, six-, or seven-membered, acylamino- or diacylamino-containing heterocyclic ring moiety, and $R^{21}$ is divalent linking group, more typically a divalent linking group selected from poly(alkyleneoxy), —O—C(O)—, —NH—C(O)— and —(CH$^2$)$_m$—, wherein m is an integer of from 1 to 10, more typically of from 1 to 3, or is absent.

In one embodiment, the copolymer comprises one or more second constitutional repeating units that comprise at least one cationic moiety per such unit. In one embodiment, the copolymer comprises one or more second constitutional repeating units that each independently comprise at least one anionic moiety per such unit. In one embodiment, the copolymer comprises one or more second constitutional repeating units that each independently comprise at least one amphoteric/zwitterionic moiety per such unit. In one embodiment, the copolymer comprises one or more second constitutional repeating units that each independently comprise at least one nonionic moiety per such unit. In one embodiment, the copolymer comprises one or more second constitutional repeating units that each independently comprise at least one cationic moiety per such unit and one or more second constitutional repeating units that each independently comprise at least one anionic moiety per such unit. In one embodiment, the copolymer comprises one or more second constitutional repeating units that each independently comprise at least one cationic moiety per such unit and one or more second constitutional repeating units that each independently comprise at least one amphoteric/zwitterionic moiety per such unit. In one embodiment, the copolymer comprises one or more second constitutional repeating units that each independently comprise at least one cationic moiety per such unit and one or more second constitutional repeating units that each independently comprise at least one nonionic moiety per such unit. In one embodiment, the copolymer comprises one or more second constitutional repeating units that each independently comprise at least one anionic moiety per such unit and one or more second constitutional repeating units that each independently comprise at least one amphoteric/zwitterionic moiety per such unit. In one embodiment, the copolymer comprises one or more second constitutional repeating units that each independently comprise at least one anionic moiety per such unit and one or more second constitutional repeating units that each independently comprise at least one nonionic moiety per such unit. In one embodiment, the copolymer comprises one or more second constitutional repeating units that each independently comprise at least one amphoteric/zwitterionic moiety per such unit and one or more second constitutional repeating units that each independently comprise at least one nonionic moiety per such unit.

The second constitutional repeating units may be made by known synthetic techniques, such as, for example, by grafting of ionic or nonionic organic moieties onto a polymer backbone, such as a hydrocarbon polymer backbone, a polyester polymer backbone, or a polysaccharide polymer backbone, or by copolymerization of a second monomer, as described below, with, for example, the above-described first monomer.

In one embodiment, the second constitutional repeating units of the copolymer of the present invention are derived from a second monomer that is copolymerizable with the first monomer and comprises, per molecule of the monomer, at least one reactive functional group and at least one nitrogenous cationic group selected from:

acyclic groups that comprise at least one primary, secondary, or tertiary amino nitrogen atom or quaternary nitrogen atom per group, and five or six-membered heterocylic ring-containing groups that comprise at least one nitrogen atom, which may be a quaternary nitrogen atom, as a ring member, such as, for example, pyrrolidinyl, pyrrolinyl, imidazolidinyl, pyrrolyl, imidazolyl, pyrazolidinyl, pyrazolinyl, piperidinyl, piperazinyl, pyridinyl, pyrazinyl, pyrimadinyl, or pyridazinyl moiety.

In one embodiment, the acyclic groups that comprise at least one primary, secondary, or tertiary amino nitrogen atom or quaternary nitrogen atom per group is a an acyclic moiety that is cyclizable, either simultaneously with or subsequent to copolymerization with the first monomer, to form a five or six-membered heterocylic ring that comprises at least one nitrogen atom, which may be a quaternary nitrogen atom, as a ring member.

In one embodiment, the second constitutional repeating units of the copolymer of the present invention are derived from a second monomer comprising, per molecule of the monomer, at least one reactive functional group and at least one group that is (i) selected from ionic organic moieties and nonionic organic moieties, and (ii) is not a saturated or unsaturated, five-, six-, or seven-membered, acylamino- or diacylamino-containing heterocyclic ring moiety.

Suitable reactive functional groups are those described above in regard to the first monomer.

In one embodiment, the first monomer comprises one or more compounds according to structure (IV):

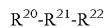
$R^{20}$-$R^{21}$-$R^{22}$                                                                     (IV)

wherein:
$R^{20}$ and $R^{21}$ are each as described above, and
$R^{22}$ is a reactive functional group, more typically a reactive group selected from —CH$_2$═CH$_2$, and —H(CH$_3$)C═CH$_2$.

Suitable cationic monomers include, for example, dimethylaminomethyl (meth)acrylate, dimethylaminopropyl (meth)acrylate, di(t-butyl)aminoethyl (meth)acrylate, dimethylaminomethyl (meth)acrylamide, dimethylaminoethyl (meth)acrylamide, dimethylaminopropyl (meth)acrylamide, vinylamine, vinyl imidazole, vinylpyridine, vinylpyrrolidine, vinylpyrroline, vinylpyrazolidine, vinylpyrazoline, vinylpiperidine, vinylpiperazine, vinylpyridine, vinylpyrazine, vinylpyrimadine, vinylpyridazine, trimethylammonium ethyl (meth)acrylate salts, dimethylammonium ethyl (meth)acrylate salts, dimethylbenzylammonium (meth)acrylate salts, benzoylbenzyl dimethylammonium ethyl(meth)acrylate salts, trimethyl ammonium ethyl (meth)acrylamido salts, trimethyl ammonium propyl (meth)acrylamido salts, vinylbenzyl trimethyl ammonium salts, diallyldimethyl ammonium salts.

In one embodiment, the second constitutional repeating units of the copolymer of the present invention are derived from a cationic monomer selected from diallyldimethylammonium salts, such as diallyldimethylammonium nitrate, quaternized dimethylaminoethyl(meth)acrylate salts, such as quaternized dimethylaminoethyl(meth)acrylate nitrate, and quaternized vinylimidazole salts, such as quaternized vinylimidazole nitrate.

Suitable anionic monomers include, for example, acrylic acid, acrylic acid, methacrylic acid, vinyl sulphonic acid, vinylbenzene sulphonic acid, (meth)acrylamidomethylpropane sulphonic acid, 2-sulphoethyl methacrylate, and styrenesulfonate, as well as mixtures of and salts thereof.

Suitable amphoteric/zwitterionic monomers include, for example, sulfobetaine (meth)acrylates, sulfobetaine (meth)acrylamides, sulfobetaine (meth)allyl compounds, sulfobetaine vinyl compounds, carboxybetaine (meth)acrylates, carboxybetaine (meth)acrylamides, caboxybetaine (meth)allyl compounds and carboxybetaine vinyl compounds, such as for example, N-(3-sulfopropyl)-N-(methacryloxyethyl)-N,N-dimethyl ammonium betaine, N-(3-acrylamidopropyl)-N,N-dimethylammonioacetate, or N-(3-acryloamidopropyl)-N,N-dimethyl-N-(carboxymethyl)ammonium bromide.

Suitable nonionic monomers include, for example, (meth)acrylamide, esters of an monoethylenically unsaturated monocarboxylic acids, such as methyl (meth)acrylate, ethyl (meth)acrylate, n-propyl (meth)acrylate, n-butyl(meth)acrylate, 2-ethyl-hexyl (meth)acrylate, or hydroxyalkyl esters such as 2-hydroxyethyl (meth)acrylate, polyethylene and/or polypropylene oxide (meth)acrylates (i.e. polyethoxylated and/or polypropoxylated (meth)acrylic acid), vinyl alcohol, vinyl acetate, vinyl versatate, vinyl nitriles, acrylonitrile, vinyl aromatic compounds, such as styrene, and mixtures thereof.

In one embodiment, the copolymer comprises, based on 1000 constitutional repeating units:
from 500 to 999, more typically from 800 to 999, even more typically from 900 to 990, first constitutional repeating units, and
from 1 to 500, more typically from 1 to 200, even more typically from 10 to 100 second constitutional repeating units.

In one embodiment, the copolymer is made by copolymerizing a mixture of monomers that comprises more first monomers and one or more second monomers that each independently comprise at least one cationic moiety per molecule of such monomer. In one embodiment, the copolymer is made by copolymerizing a mixture of monomers that comprises one or more first monomers and one or more second monomers that each independently comprise at least one anionic moiety per molecule of such monomer. In one embodiment, the copolymer is made by copolymerizing a mixture of monomers that comprises one or more first monomers and one or more second monomers that each independently comprise at least one amphoteric/zwitterionic moiety per molecule of such monomer. In one embodiment, the copolymer is made by copolymerizing a mixture of monomers that comprises one or more first monomers and one or more second monomers that each independently comprise at least one nonionic moiety per molecule of such monomer. In one embodiment, the copolymer is made by copolymerizing a mixture of monomers that comprises one or more first monomers, one or more second monomers that each independently comprise at least one cationic moiety per molecule of such monomer, and one or more second monomers that each independently comprise at least one anionic moiety per molecule of such monomer. In one embodiment, the copolymer is made by copolymerizing a mixture of monomers that comprises one or more first monomers, one or more second monomers that each independently comprise at least one cationic moiety per molecule of such monomer, and one or more second monomers that each independently comprise at least one amphoteric/zwitterionic moiety per molecule of such monomer. In one embodiment, the copolymer is made by copolymerizing a mixture of monomers that comprises one or more first monomers, one or more second monomers that each independently comprise at least one cationic moiety per molecule of such monomer, and one or more second monomers that each independently comprise at least one nonionic moiety per molecule of such monomer. In one embodiment, the copolymer is made by copolymerizing a mixture of monomers that comprises one or more first monomers, one or more second monomers that each independently comprise at least one anionic moiety per molecule of such monomer, and one or more second monomers that each independently comprise at least one amphoteric/zwitterionic moiety per molecule of such monomer. In one embodiment, the copolymer is made by copolymerizing a mixture of monomers that comprises one or more first monomers, one or more second monomers that each independently comprise at least one anionic moiety per molecule of such monomer, and one or more second monomers that each independently comprise at least one nonionic moiety per molecule of such monomer. In one embodiment, the copolymer is made by copolymerizing a mixture of monomers that comprises one or more first monomers, one or more second monomers that each independently comprise at least one amphoteric/zwitterionic moiety per molecule of such monomer, and one or more second monomers that each independently comprise at least one nonionic moiety per molecule of such monomer.

In one embodiment, the copolymer is made by copolymerizing a mixture of monomers, comprising, based on 1000 moles of such monomers:
(a) from 800 to 999 moles of one or more first monomers, each independently comprising at least one reactive functional group per molecule and at least one pendant saturated or unsaturated, five-, six-, or seven-membered acylamino- or diacylamino-containing heterocyclic ring moiety per molecule, and
(b) from 1 to 200 moles of one or more second monomers, each independently comprising at least one reactive functional group per molecule and at least one pendant organic moiety that comprises at least one primary, secondary, or tertiary amino nitrogen atom or quaternary nitrogen atom per molecule.

The copolymer of the present invention typically has a weight average molecular weight of greater than or equal to 5,000 grams per mole (g/mol), more typically, a weight average molecular weight of from about 10,000 to about 10,000,000 g/mol.

The copolymer of the present invention typically has weight average molecular weight of greater than or equal to 5,000 grams per mole (g/mol), more typically, a weight average molecular weight of from about 10,000 to about 2,000,000 g/mol, even more typically from about 10,000 to about 500,000 g/mol, and still more typically from about 10,000 to about 100,000 g/mol.

In one embodiment, the copolymer is a random copolymer, comprising chains of randomly arranged first constitutional repeating units and second constitutional repeating units. In one embodiment, the copolymer is a block copolymer, comprising blocks of two or more consecutive first constitutional repeating units and blocks of two or more consecutive second constitutive units.

Methods for making suitable copolymers are known in the art. In one embodiment, the polymer according to the present invention is made by copolymerization of ethylenically unsaturated monomers according to known free radical polymerization processes. In one embodiment, the copolymer is made by a controlled free radical polymerization techniques, such as the known controlled free radical polymerization processes of atom transfer radical polymerization ("ATRP"), reversible addition fragmentation transfer ("RAFT" polymerization), or macromolecular design via interchange of xanthates ("MADIX" polymerization).

If the second monomer comprises a reactive group that is cyclizable to form a five or six-membered heterocylic ring that comprises at least one quaternized or quaternizable nitrogen atom as a ring member, the cyclization to form the heterocylic ring structure may be conducted simultaneously with the copolymerization with the first monomer, such as by, for example, simultaneous polymerization and cyclization of a quaternized or quaternizable nitrogen atom-containing diallyl monomer, or conducted subsequent to such polymerization.

If the second monomer comprises a quaternizable nitrogen atom as a ring member, then the nitrogen may be quaternized subsequent to the polymerization reaction.

In one embodiment, the copolymer is a random copolymer made by free radical polymerization of vinyl pyrrolidone, vinyl caprolactam, or vinyl pyrrolidone and vinyl caprolactam with one or more ethylenically unsaturated cationic monomers.

In one embodiment, the copolymer is a random copolymer made by free radical polymerization of a monomer mixture comprising from about 80 pbw to less than 100 pbw, more typically from about 90 pbw to about 99 pbw, of vinyl pyrrolidone and from greater than 0 to about 20 pbw, more typically from about 1 to about 10 pbw, of a diallyldimethylammonium salt.

In one embodiment, the at least one silver compound comprises silver nitrate, the at least one polyol comprises ethylene glycol or glycerol, the at least one acid scavenger comprises LiOH, $Na_2S$, $Ca(OH)_2$, bicine, or a mixture thereof, the total amount of silver nitrate added to the reaction mixture is from $1.5 \times 10^{-3}$ mole to about 1 mole silver nitrate per Liter of reaction mixture, the reaction is conducted in the presence of, based on the weight of the reaction mixture, from about 0.01 wt % to about 50 wt %, more typically from about 0.1 wt % to about 20 wt %, and even more typically from about 0.5 wt % to 8 wt %, of a random copolymer made by free radical polymerization of a monomer mixture comprising from about 80 pbw to less than 100 pbw, more typically from about 90 pbw to about 99 pbw, of vinyl pyrrolidone and from greater than 0 to about 20 pbw, more typically from about 1 to about 10 pbw, of a diallyldimethylammonium salt.

The process of the present invention may be carried out on any scale without diminution in the quality of the silver nanostructures made. As used herein, the term "small-scale" refers to processes wherein the total amount of the at least one polyol is less than 1000 g. The term "large-scale" refers to processes wherein the total amount of the at least one polyol is greater than 1000 g.

The process of the present invention typically produces a high yield of silver nanowires. In one embodiment, greater than or equal to 70 wt % of silver feed is converted to nanowires and less than 30 wt % of silver feed is converted to isotropic nanostructures, more typically greater than or equal to 80 wt % of silver feed is converted to nanowires and less than 20 wt % of silver feed is converted to isotropic nanoparticles, and even more typically more than 90 wt % of silver feed is converted to nanowires and less than 10 wt % of silver feed is converted to isotropic nanostructures. In one embodiment, greater than or equal to 99 wt % of silver feed is converted to nanowires and less than 1 wt % of silver feed is converted to isotropic nanostructures.

In one embodiment, the silver nanostructures comprise elongated silver nanostructures, known as "silver nanowires" having a diameter of from about 5 nm to about 2 µm, more typically from about 10 nm to about 150 nm, even more typically from about 10 nm to about 60 nm, and a length of from about 5 µm to about 300 µm, more typically from about 10 µm to about 200 µm.

In one embodiment, the silver nanostructures comprise elongated silver nanostructures, known as "silver nanowires" having a diameter of from about 10 nm to about 2 µm, more typically from about 10 nm to about 150 nm, even more typically from about 10 nm to about 60 nm, and a length of from about 5 µm to about 300 µm, more typically from about 10 to about 200 µm.

In one embodiment, the silver nanostructures comprise silver nanowires having a diameter of from about 25 nm to about 50 nm, and a length of from about 20 µm to about 30 µm. In one embodiment, the silver nanostructures comprise silver nanowires having a diameter of from about 25 nm to about 50 nm, and a length of about 20 µm.

In one embodiment, the silver nanostructures comprise silver nanowires having a diameter of from about 10 nm to about 150 nm, even more typically from about 10 nm to about 60 nm, and an aspect ratio, that is, a length to diameter ratio, of greater than 100, or greater than 150, or greater than 200, or greater than 300.

In one embodiment, the silver nanostructures comprise silver nanowires having a diameter of from about 10 nm to about 150 nm, even more typically from about 10 nm to about 60 nm, and an aspect ratio of greater than 3000.

In one embodiment, the silver nanostructures comprise silver nanowires having a diameter of from about 20 nm to about 50 nm, and an aspect ratio of greater than 3000.

In one embodiment, the nanowires made by the process of the present invention exhibit an aspect ratio that is, on average, greater than that of nanowires made by an analogous product wherein poly(vinyl pyrrolidone) is substituted for the copolymer component of the process of the present invention. In one embodiment, the nanowires made by the process of the present invention exhibit an aspect ratio that is, on average, greater than that of nanowires made by an analogous product wherein poly(vinyl pyrrolidone is substituted for the copolymer component of the process of the present invention by a factor of a least 2, more typically by a factor of at least 3.

The product mixture comprises polyol, copolymer, and silver nanostructures, wherein the silver nanostructures comprise silver nanowires and may comprise silver nanostructures other than silver nanowires, such as, isotropic silver particles.

The silver nanostructures may be isolated from the polyol and copolymer components of the product mixture by, for example, gravity separation, centrifugation, or filtration. In one embodiment, the silver nanostructures are then washed in water, an alcohol, typically a $(C_1$-$C_3)$alkanol, or a mixture of water and alkanol, to remove residues of the polyol and copolymer from the isolated nanowires.

In one embodiment, the silver nanostructures are washed to remove residues of the polyol, copolymer, and isotropic nanostructures from the isolated nanowires.

Silver nanowires produced by the process of the present invention may be separated from other non-nanowire silver nanostructure components that may be present in the product mixture by dispersing the silver nanostructures in a polar aprotic organic liquid, such as acetone or acetonitrile, followed by isolation of the nanowires from the liquid by gravity separation or centrifugation. The silver nanowires tend to agglomerate and precipitate from the polar aprotic liquid, while isotropic silver nanostructures tend to remain suspended in the polar aprotic organic liquid.

In one embodiment, the product mixture is subjected to gravity separation, the silver nanowire fraction of the separated product mixture is re-dispersed in acetone and subjected to gravity separation and the silver nanowire fraction of the separated acetone dispersion is then re-dispersed in water, alcohol or a mixture thereof.

In an embodiment, the silver nanowire fraction of the separated product mixture is flocculated in acetone and subjected to gravity separation and the silver nanowire fraction of the separated acetone dispersion is then re-dispersed in water, alcohol or a mixture thereof.

The residue of the copolymer used in the process of the present invention is more easily cleaned from the silver nanostructure product than the poly(vinylpyrrolidone) homopolymer of prior art processes, which typically require multiple iterations of water or water and alcohol washing to remove from the silver nanostructure product. For example, the copolymer residue may typically be removed from the silver nanostructures in a single water/alkanol washing step, while removal of poly(vinyl pyrrolidone homopolymer residue from silver nanostructures typically requires form 5 to 10 iterations of an analogous water/alkanol washing step. Reducing the amount of or eliminating the copolymer or homopolymer from the dispersion of silver nanowires is of great benefit in using the silver nanowires to easily make electrically conductive polymer films having very high conductivity. The silver nanowires of the dispersion of the present invention can be used to make polymer films having high electrical conductivity without requiring the extra steps required by prior art processes, such as iterative washing steps or heat treating or heating and compressing the silver nanowire network to displace a coating of vinylpyrrolidone residue from the surfaces of the nanowires and allow metal to metal contact between the nanowires of the network.

In one embodiment, silver nanowires are provided in the form of a dispersion comprising silver nanowires dispersed in liquid medium comprising water, a ($C_1$-$C_6$)alkanol, or a mixture thereof. Including an alkanol component in the liquid medium of the dispersion is of benefit in reducing oxidation of the silver nanostructure component of the dispersion.

The nanowire dispersion comprises silver nanowires dispersed in aqueous medium wherein the dispersion typically comprises less than 10,000 pbw, more typically less than 1000 pbw, of the copolymer per 1,000,000 pbw of silver nanowires.

In one embodiment, the nanowire dispersion comprises silver nanowires dispersed in aqueous medium wherein the dispersion comprises less than 100 pbw, or less than 10 pbw, or less than 5 pbw or less than 1 pbw of the copolymer per 1,000,000 pbw of silver nanowires. In one embodiment, the dispersion comprises no detectable amount of the copolymer.

The silver nanostructures made according to the processes of the present invention may be used in an electrically conductive coating.

In one embodiment, the electrically conductive coating is made by depositing a layer of a silver nanowire dispersion, for example, by casting, spray coating, spin coating, gravure coating, curtain coating, dip coating, slot-die coating, ink jet printing, gravure printing, or screen printing, on a substrate and removing the liquid medium from the layer. Typically, the liquid medium is removed from the layer by allowing the liquid medium component of the layer to evaporate. The substrate supported layer may be subjected to elevated temperature to encourage evaporation of the liquid medium.

The substrate on which the layer is formed may be rigid or flexible and may comprise, for example, a metal; a polymer, such as, for example, a polymer selected from polyesters, polysulfones, polyethersulfones, polyarylates, polyimides, polyetherimides, polytetrafluoroethylenes, poly (ether ketone)s, poly(ether ether ketone)s, poly((meth)acrylate)s, polycarbonates, polyolefins, and mixtures thereof; a glass, a paper, or a ceramic material. In one embodiment, the substrate is glass.

The sheet resistance of the electrically conductive coating can be measured using techniques known to those of ordinary skill in the art. For example, a four probe tester may be used to make multiple measurements from which an arithmetic average sheet resistance can be calculated. The transmittance and haze of the electrically conductive coating of the present invention may be measured using a hazemeter.

The silver nanowires made by the process of the present invention are useful as a component of an electrically conductive film, possibly in combination with an electrically conductive polymer. Suitable electrically conductive polymers include electrically conductive polythiophene polymers, electrically conductive poly(selenophene) polymers, electrically conductive poly(telurophene) polymers, electrically conductive polypyrrole polymers, electrically conductive polyaniline polymers, electrically conductive fused polycylic heteroaromatic polymers, and blends of any such polymers. In one embodiment, the electrically conductive polymer comprises a doped electrically conductive polymer known as PEDOT:PSS, which comprises poly(3,4-ethylenedioxythiophene or "PEDOT" and a water soluble polymeric acid dopant comprising a poly(styrene sulfonic acid) or "PSS". Such electrically conductive polymer films typically exhibit high conductivity and high optical transparency and are useful as a layer in an electronic device. Suitable electronic devices include any device that comprises one or more layers of semiconductor materials and makes use of the controlled motion of electrons through such one or more layers, such as, for example: devices that converts electrical energy into radiation, such as, for example, light-emitting diodes, light emitting diode displays, diode lasers, or lighting panels, devices that detect signals through electronic processes, such as, for example, photodetectors, photoconductive cells, photoresistors, photoswitchs, phototransistors, phototubes, infrared ("IR") detectors, or biosensors, devices that convert radiation into electrical energy, such as, for example, photovoltaic devices or solar cells, and devices that includes one or more electronic components with one or more semiconductor layers, such as, for example, transistors or diodes.

In one embodiment, the process of the present invention permits the use of a higher concentration of silver compound, for example silver nitrate, in the reaction mixture which enables production of a product mixture having a higher concentration of silver nanostructures, more typically silver nanowires, than an analogous process wherein poly (vinyl(pyrrolidone) homopolymer is used in place of the copolymer component of the process of the present invention.

In one embodiment, the process of the present invention enables production of silver nanowires having a higher aspect ratio than silver nanowires made by an analogous process wherein poly(vinyl(pyrrolidone) homopolymer is used in place of the copolymer component of the process of the present invention.

In general, silver nanostructures made by the process of the present invention are more easily cleaned than silver nanostructures made by an analogous process wherein poly (vinyl(pyrrolidone) homopolymer is used in place of the copolymer component of the process of the present invention, because residues of the copolymer component of the process of the present invention is more easily removed from silver nanowires structures than are residues of poly (vinyl pyrrolidone) homopolymer.

EXAMPLES

The poly(vinylpyrrolidone-co-diallyldimethylammonium nitrate) random copolymers ("poly(VP-co-DADMAN)" or "p(VP-DADMAN)") of the Examples were each made by copolymerizing vinylpyrrolidone monomer with diallyldimethylammonium nitrate monomer ("DADMAN").

In general, the synthesis of poly(VP-co-DADMAN) having 1% DADMAN content (99:1) was achieved in two steps:

The first step was a counter-ion exchange to form DADMAN (Diallydimethylammonium nitrate) from commercially-available DADMAC (Diallydimethylammonium chloride). To exchange the counter-ion, a solution of 13.54 g of $AgNO_3$ dissolved in 6.44 g of deionized water was added to 21.00 g of DADMAC in water (65 wt %). The molar ratio of $AgNO_3$ to DADMAC is 1 to 1.05 in order to remove all of the $AgNO_3$ (which would otherwise give a black color to the solution). After vortex stirring, two phases appeared. The liquid supernatant, which contained DADMAN in water, is collected. The white silver solid precipitate of AgCl is washed with 5 mL of water and then centrifuged a second time to extract all the DADMAN monomer from it. The combined supernatants were filtered through a 0.20 μm filter and added to 1452 g of vinylpyrrolidone (VP) and 130 g of molecular sieves. The monomers were shaken for an hour after which the sieves were removed. The solution was subsequently introduced into a 5-L three-necked round-bottomed flask reactor.

Initiator solution was prepared separately by adding 2.20 g of azobisisobutyronitrile (AIBN) to 20.8 g (about 20 mL) of VP.

The mixture of monomers was heated up to 60° C. and stirred. 6.66 g of thiocarbonylthio transfer agent and 2.5 g of initiator solution were added to the 5-L flask. Then, 2.5 g of the initiator solution was added every 30 minutes. The reaction temperature was maintained between 57 and 62° C. After 7.5 hours, 500 g of methanol was added to the flask to reduce the viscosity of the reactant and the reaction was allowed to stir for up to 12 hours. A yellow viscous transparent liquid was obtained. This copolymer suspension was used as is without further purification, or further purified according to the following procedure.

Since VP and DADMAN are soluble in diethyl ether and poly(VP-co-DADMAN) is not, the copolymer was isolated from remaining monomer by selective precipitation in this solvent. Two volumes of ether were used for 1 volume of copolymer. The ether was removed from the resulting white precipitate, which was subsequently dried in a hood and then in a vacuum oven. The dried copolymer was ground to obtain a white, slightly yellow, fine powder.

Example 1

1.8 mg lithium chloride (LiCl), 0.017 g bicine, and 0.5 g p(VP-DADMAN) (99:1) were added to 33 g commercial ethylene glycol (Sigma Aldrich). The resulting reaction mixture was heated to 170° C. for 30 minutes under nitrogen atmosphere and moderate agitation (100-300 rpm). In the seeding step, 14 mg silver nitrate ($AgNO_3$) was dissolved in 0.45 mL of ethylene glycol and the resulting solution was subsequently added. In the feed step, a solution of 0.37 g $AgNO_3$ dissolved in 12 g ethylene glycol was added dropwise at a rate of 1.5 mL/minute. After 15 minutes from the start of the dropwise feed, the reaction was stopped. Silver nanowires having average diameter of about 40 nm were obtained in a yield of about 60%.

The optical microscope image of silver nanowires of Example 1 is shown in FIG. 1.

Example 2

1.8 mg lithium chloride (LiCl), 0.017 g bicine, and 0.5 g p(VP-DADMAN) (99:1) were added to 33 g distilled ethylene glycol. The resulting reaction mixture was heated to 170° C. for 30 minutes under nitrogen atmosphere and moderate agitation (100-300 rpm). In the seeding step, 14 mg silver nitrate ($AgNO_3$) was dissolved in 0.45 mL of distilled ethylene glycol and the resulting solution was subsequently added. In the feed step, a solution of 0.37 g $AgNO_3$ dissolved in 12 g distilled ethylene glycol was added dropwise at a rate of 1.5 mL/minute. After 15 minutes from the start of the dropwise feed, the reaction was stopped.

Figure 2:
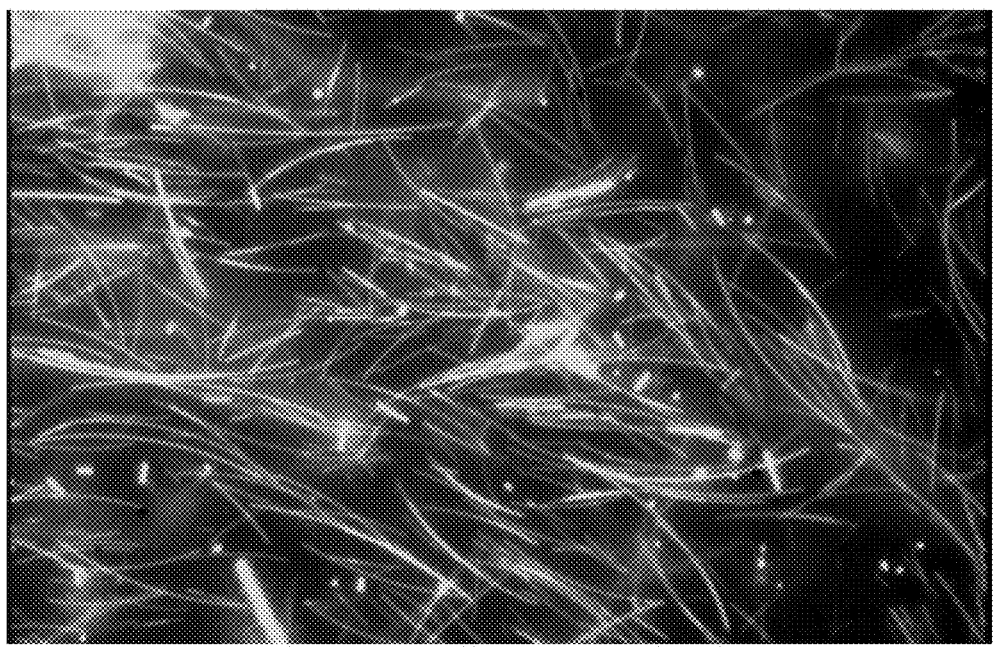
FIG. 2: An optical microscope image of silver nanowires formed by the process of the present invention as illustrated in Example 2.

The optical microscope image of silver nanowires of Example 2 is shown in FIG. 2. Distillation of the ethylene glycol prior to use in Example 2 resulted in silver nanowires that are more monodisperse with respect to length than those of Example 1.

Example 3

A 125-mL three-necked flask was charged with 23 g of ethylene glycol, 0.012 g of $Ca(OH)_2$, 1.4 mg LiCl and 0.5 g p(VP-DADMAN) and then heated to 162° C. The temperature was allowed to stabilize for 30 min under nitrogen atmosphere and moderate agitation (100-300 rpm). In the seed step, a solution of 6 mg $AgNO_3$ dissolved in 0.5 g of ethylene glycol was added. In the feed step, a solution of 0.30 g of $AgNO_3$ dissolved in 12 g ethylene glycol was added dropwise at a rate of 1.5 mL/minute. After 15 minutes from the start of the dropwise feed, the reaction was stopped by quenching in ice. The average diameter of the silver nanowires obtained was less than 40 nm. The average length of the silver nanowires was determined to be about 20 micrometers.

Figure 3A:
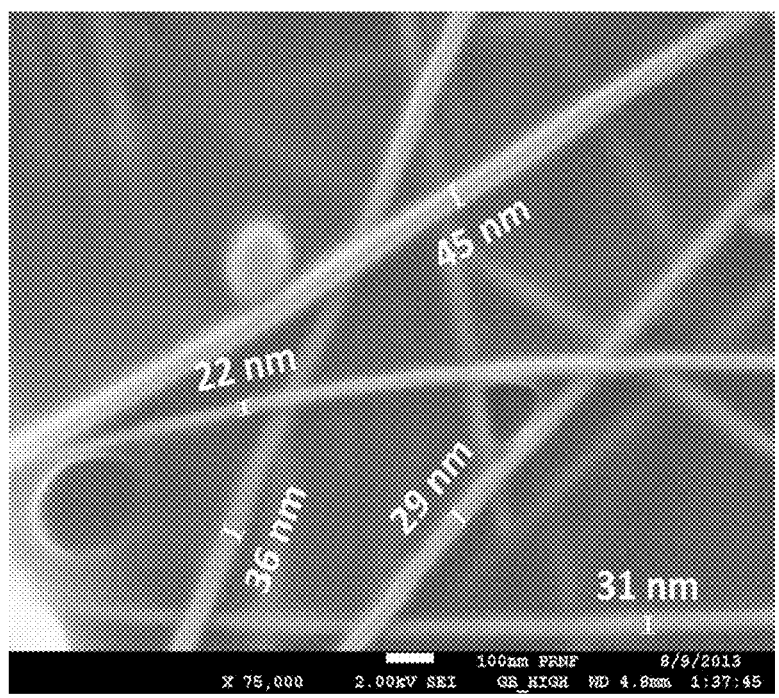
FIGS. 3a and 3b: SEM images of silver nanowires formed by the process of the present invention as illustrated in Example 3.
Figure 3B:
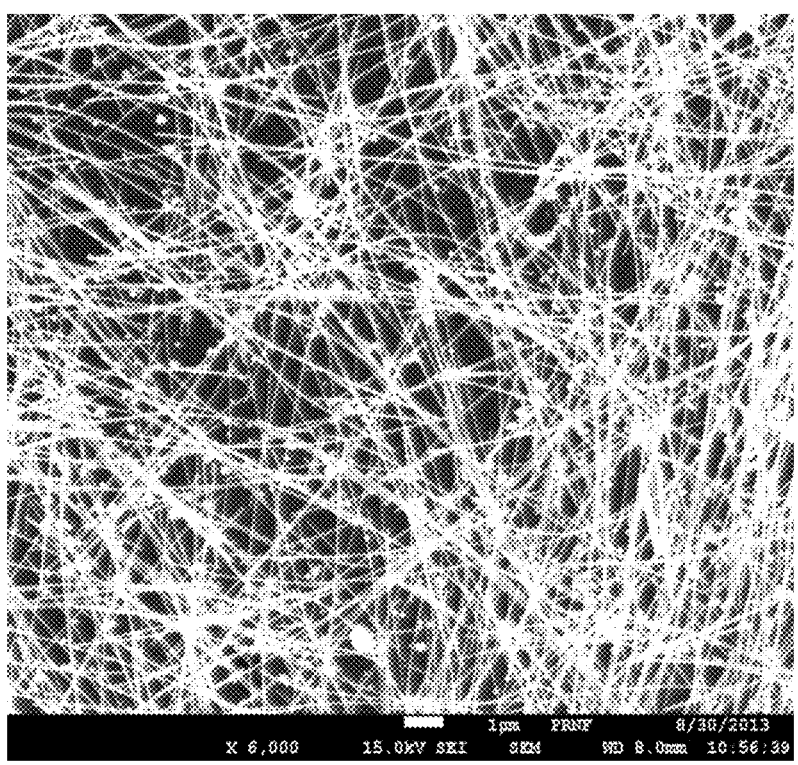

The SEM images of the silver nanowires of Example 3 are shown in FIGS. 3a and 3b.

Example 4

1.8 mg LiCl, 0.017 g bicine, 0.0004 g lithium hydroxide (LiOH), and 0.5 g PVP-DADMAN (99:1) were added to 33 g ethylene glycol, and heated to 170° C. for 30 minutes under nitrogen atmosphere and moderate agitation (100-300 rpm). In the seed step, a solution of 14 mg $AgNO_3$ dissolved in 0.45 mL of ethylene glycol was added to the reaction mixture. In the feed step, a solution of 0.5 g $AgNO_3$ dissolved in 15 g ethylene glycol was added dropwise at a rate of 1.5 ml/minute. After 15 minutes from the start of the dropwise feed, the reaction was stopped by quenching the reaction in ice.

Figure 4:
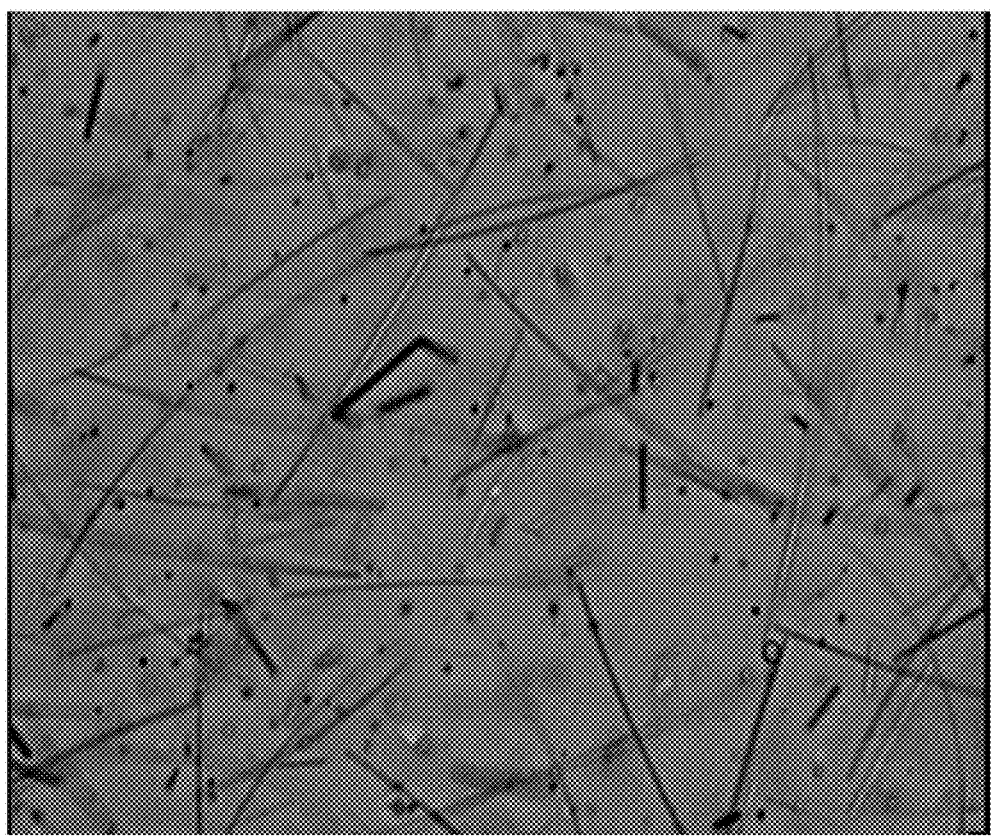
FIG. 4: An optical microscope image of silver nanowires formed by the process of the present invention as illustrated in Example 4.

An optical microscope image of the silver nanowires of Example 4 is shown in FIG. 4.

Example 5

1.8 mg LiCl, 0.10 mL 10% w/w $Na_2S$ in ethylene glycol, 0.0014 g $Ca(OH)_2$, and 0.5 g p(VP-DADMAN) (99:1) were added to 40 g ethylene glycol and then heat to 170° C. for 30 minutes under nitrogen atmosphere and moderate agitation (100-300 rpm). In the seed step, a solution of 14 mg $AgNO_3$ dissolved in 0.45 mL of ethylene glycol was added. In the feed step, a solution of 0.33 g $AgNO_3$ dissolved in 15 g ethylene glycol was added drop-wise to the reaction mixture at a rate of 1.5 ml/minute. After 15 minutes from the start of the drop-wise feed, the reaction was stopped by quenching reaction in ice.

Very long silver nanowires with average length more than 30 micrometers and average diameter around 40-45 nm were obtained.

Figure 5:
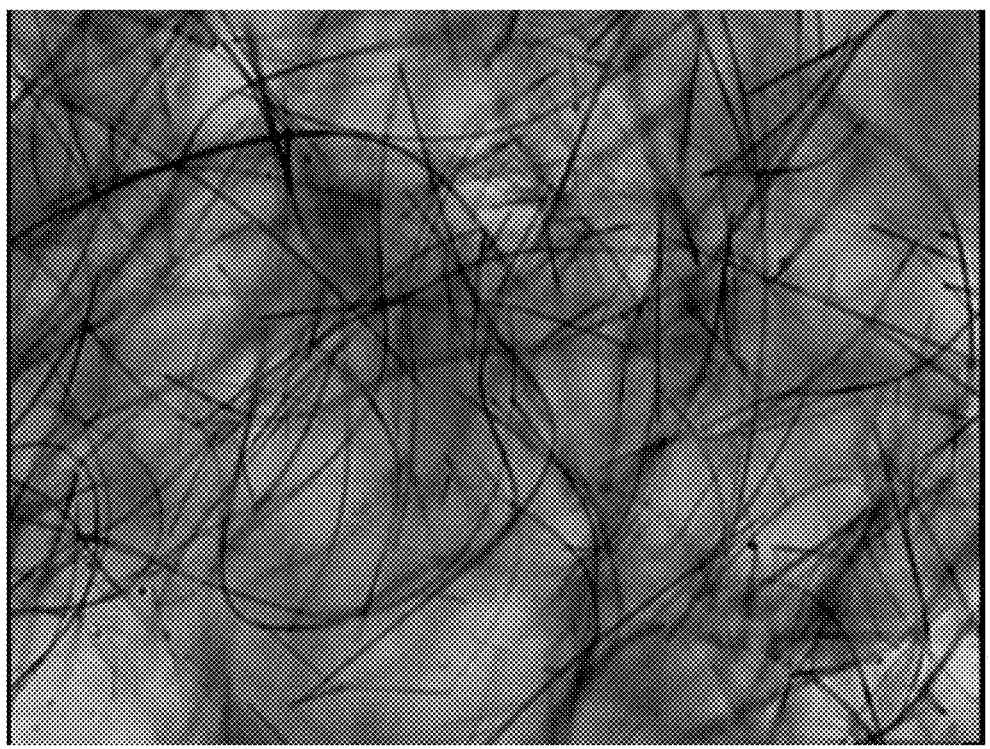
FIG. 5: An optical microscope image of silver nanowires formed by the process of the present invention as illustrated in Example 5.

An optical microscope image of the silver nanowires of Example 5 is shown in FIG. 5.

Example 6

The formation of silver nanowires according to the present invention may be carried out on a large scale. Large-scale syntheses of silver nanowires according to the present invention are illustrated in Examples 6 and 7.

A 5-L three-necked reactor was charged with 1,320 g ethylene glycol, 0.056 g lithium chloride (LiCl), 20 g p(VP-DADMAN) copolymer, 0.44 g bicine, and 0.02 g LiOH and heated to 173° C. while bubbling nitrogen into the reaction mixture for 20 minutes so as to remove all oxygen from the solution. The first step (seeding step) was achieved by adding 0.85 g of silver nitrate. The reaction mixture quickly turned brown. The reactants were left for 8 min before continuing the process. A feeding solution was made by dissolving 20 g silver nitrate in 360 g of ethylene glycol. In the second step (feeding step), the feeding solution was added using a peristaltic pump at a rate of 40 mL/min. The reaction subsequently turned dark then grey. The characteristic flow of nanowires usually appeared 8 minutes after the beginning of the feeding. The reaction took about 15 minutes to be completed. The silver nanowires produced had average diameter around 45 nm and average length of about 20 micrometers.

Figure 6:
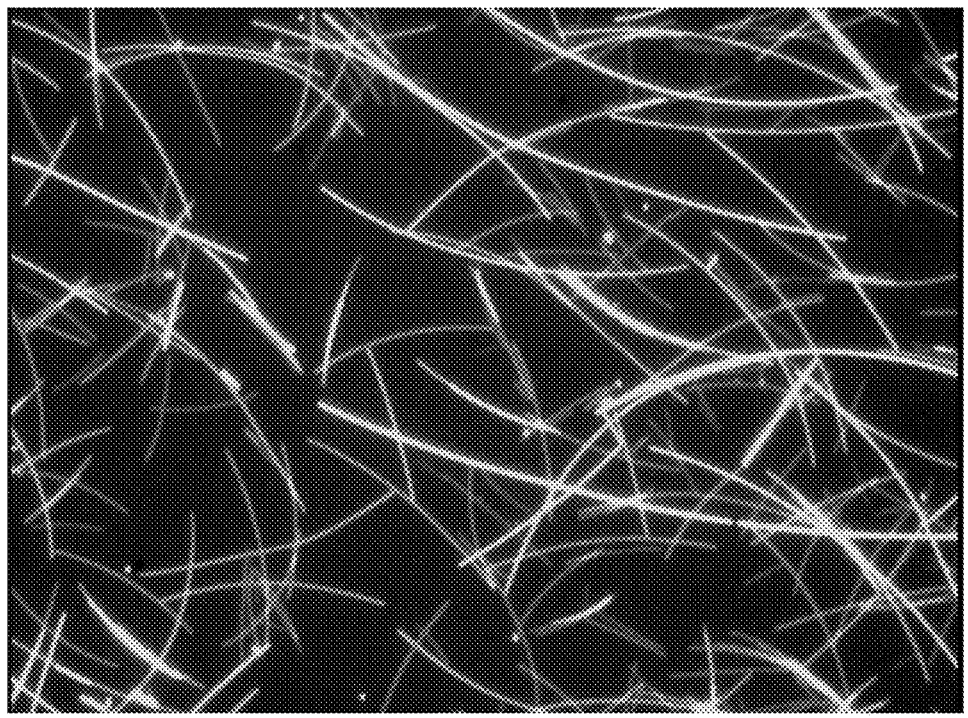
FIG. 6: An optical microscope image of silver nanowires formed by the process of the present invention as illustrated in Example 6.

The optical microscope image of the silver nanowires produced in Example 6 is shown in FIG. 6.

Example 7

800 g of distilled ethylene glycol, 12 g p(VP-DADMAN), 520 μL of LiCl solution (0.7 g LiCl in 10 mL ethylene glycol), 2 mL $Na_2S$ solution (10% w/w in ethylene glycol) and 0.028 g $Ca(OH)_2$ were mixed and heated to 175° C. After 30 minutes of maintaining the temperature at 175° C., a 4-mL portion of a mixture containing 220 g ethylene glycol and 8 gm $AgNO_3$ was added in one shot. After about 10 minutes, the rest of the ethylene glycol/$AgNO_3$ mixture was added slowly over about 7 minutes. The reaction was stopped after about 15 minutes from the start of the feeding step. At this point, the wire flow was very clear and the desired grey color was obtained.

Figure 7A:
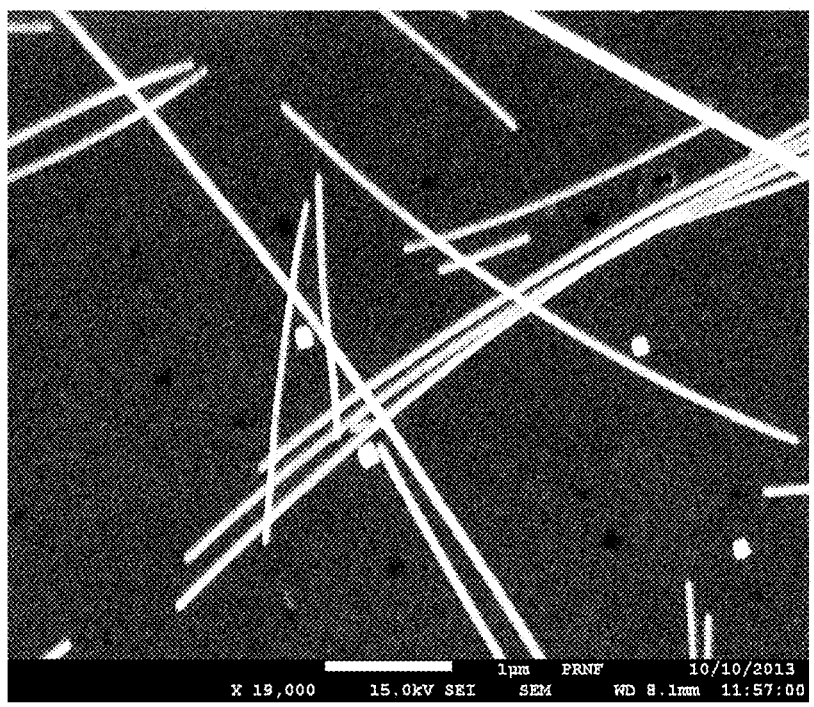
FIGS. 7a and 7b: SEM images of silver nanowires formed by the process of the present invention as illustrated in Example 7.
Figure 7B:
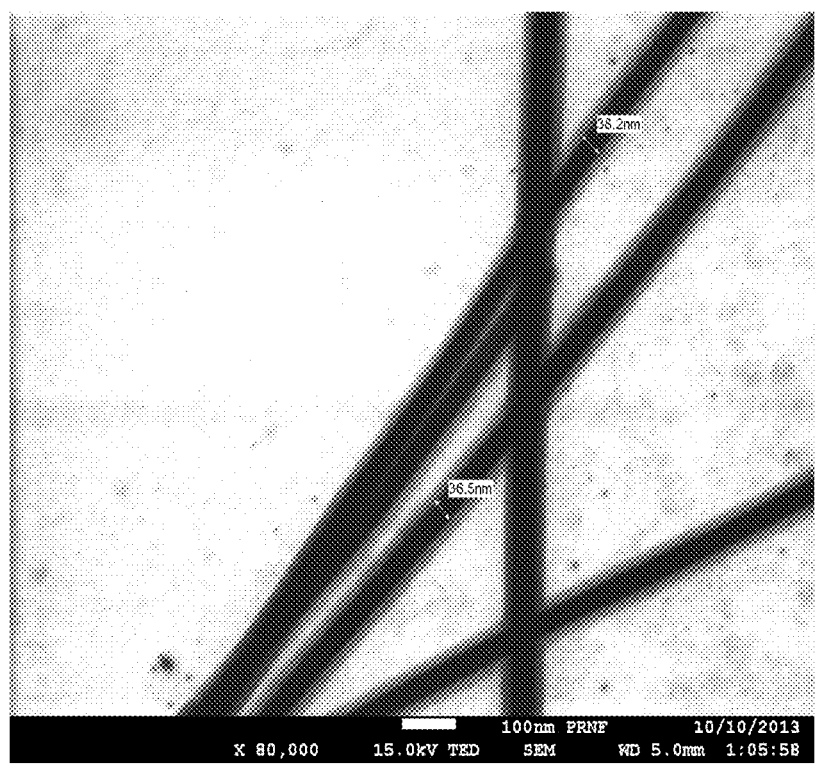

The average diameter of the silver nanowires obtained was around 38 nm. SEM images of the silver nanowires obtained in Example 7 are shown in FIGS. 7a and 7b.

Example 8

1.8 mg LiCl, 0.01 g $Ca(OH)_2$, and 0.5 g p(VP-DADMAN) (99:1) was added to 40 g glycerol, and the resulting mixture was heated to 175° C. for 30 minutes under nitrogen atmosphere and moderate agitation (100-300 rpm). In the seed step, a solution of 14 mg $AgNO_3$ dissolved in 0.45 mL of glycerol was added. In the feed step, a solution of 0.4 g of $AgNO_3$ dissolved in 12 g glycerol was added drop-wise at a rate of 1.5 mL/minute. After 15 minutes from the start of the drop-wise feed, the reaction was stopped by quenching the reaction in ice.

Generally uniform silver nanowires were obtained with average diameter of 45 nm and average length of 25 micrometers.

Figure 8:
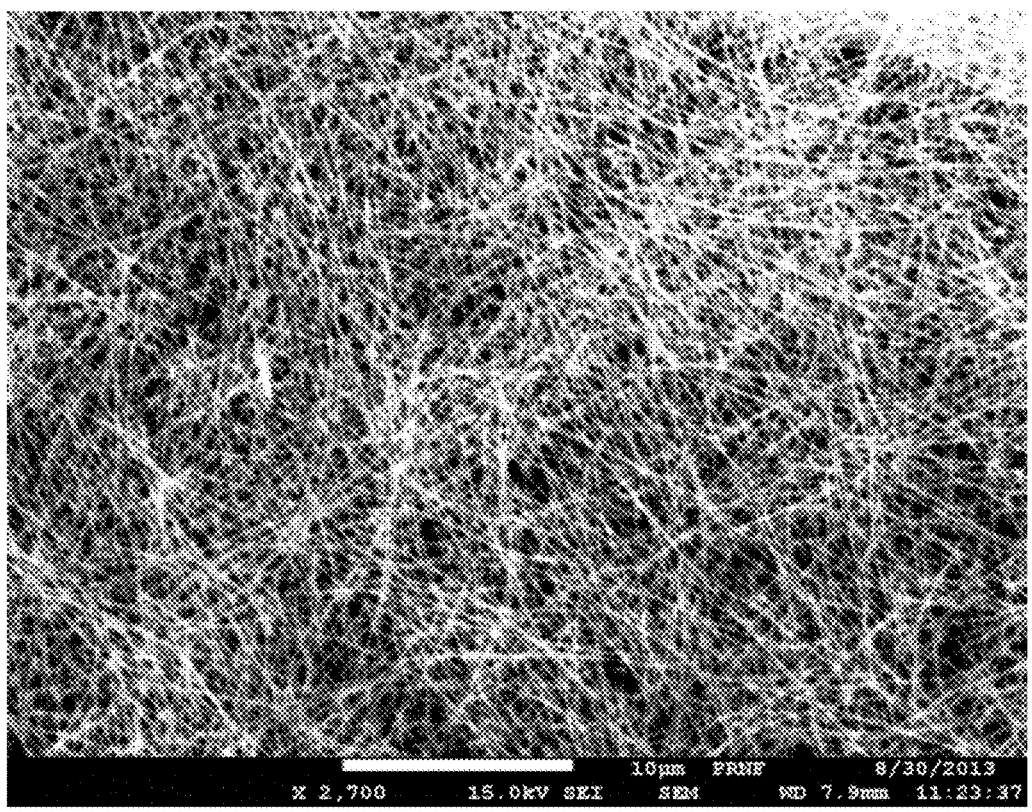
FIG. 8: An SEM image of silver nanowires formed by the process of the present invention as illustrated in Example 8.

An SEM image of the silver nanowires obtained in Example 8 is shown in FIG. 8.

Example 9

The formation of silver nanostructures, typically nanowires, according to the present invention may be achieved in a single step and by applying suitable temperature control.

30 g distilled ethylene glycol, 20 μL LiCl solution (0.7 g LiCl in 10 mL ethylene glycol), 1.8 g p(VP-DADMAN) solution (50% w/w p(VP-DADMAN) in ethylene glycol), 0.02 g $Ca(OH)_2$, and 20 μL $Na_2S$ solution (10% w/w in ethylene glycol) were mixed. The mixture was heated to 145° C. and the temperature was maintained for 20 minutes. 0.33 g of $AgNO_3$ was added to the heated mixture. After waiting for 4 minutes, the temperature was increased to 170° C. over a period of time of about 8 minutes, corresponding to a ramping rate of about 3° C./min. The temperature was then maintained at 170° C. until the desired grey color was obtained (about 4 minutes). The reaction was stopped by cooling with ice. The average diameter of the silver nanowires obtained was between 30 and 35 nm.

Figure 9A:
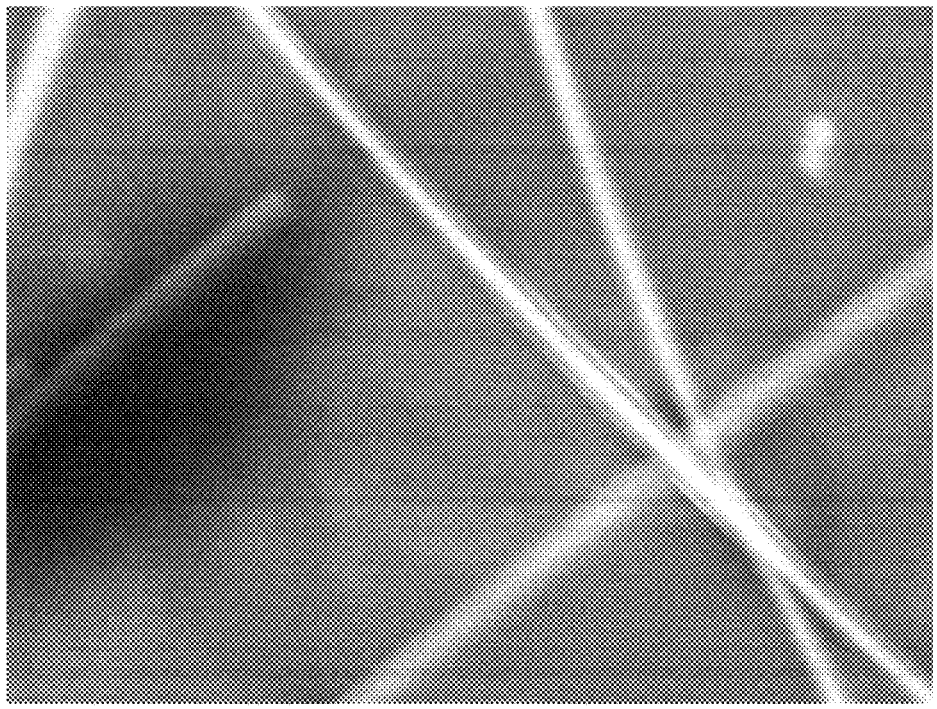
FIGS. 9a and 9b: SEM images of silver nanowires formed by the process of the present invention as illustrated in Example 9.
Figure 9B:
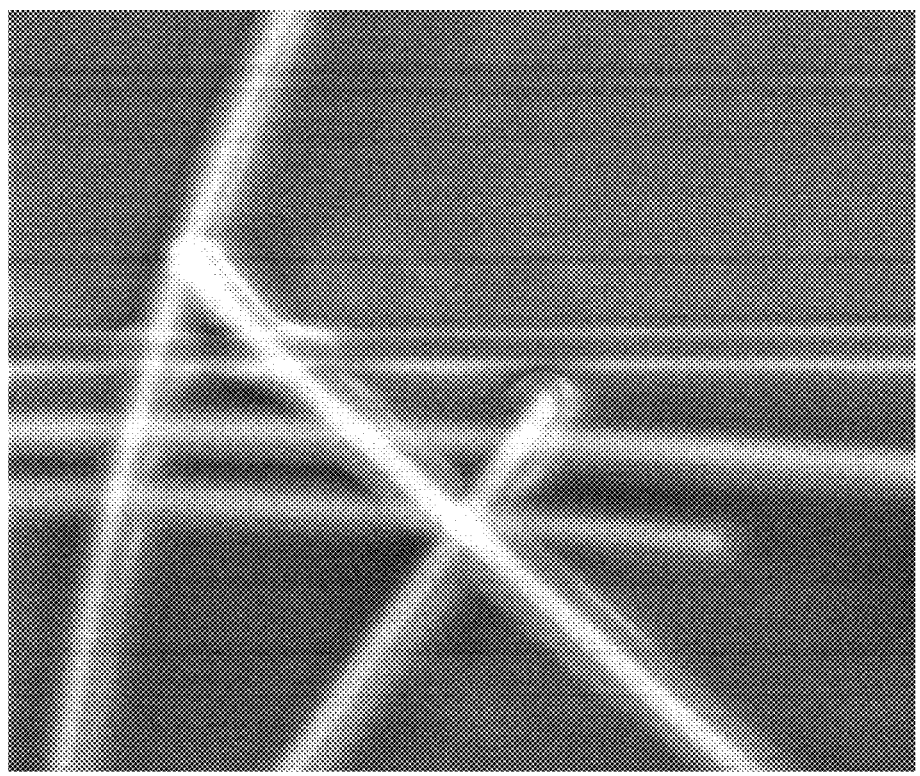

The SEM images of the silver nanowires obtained in Example 9 are show in FIGS. 9a and 9b.

Examples 10-15

Examples 10-15 were conducted according to the general procedure described below.

A 125-mL three-necked flask containing 30 g of ethylene glycol, 0.005 g of $Ca(OH)_2$, 1.4 mg LiCl, and 0.5 g p(VP-DADMAN) were heated to a specified temperature (Temperature A). The temperature was allowed to stabilize for 30 minutes under nitrogen atmosphere and moderate agitation (100-300 rpm). In the seed step, 6 mg $AgNO_3$ was dissolved in 0.5 g of ethylene glycol and the resulting solution was added to the reaction mixture. In the feed step, a specified amount of $AgNO_3$ was dissolved in 10 g ethylene glycol and then added drop-wise to the reaction mixture at a rate of 1.5 mL/minute. The temperature of the reaction mixture following the drop-wise addition (Temperature B) was then maintained or adjusted to a different temperature. After a specified amount of time (time specified from the start of the feed), the reaction was quenched in ice.

The reaction conditions and characteristics of the nanowires formed in Examples 10-15 are summarized in Table 1 below.

TABLE 1

Reaction conditions and characteristics of the nanowires formed in Examples 10-15

Figure 10:
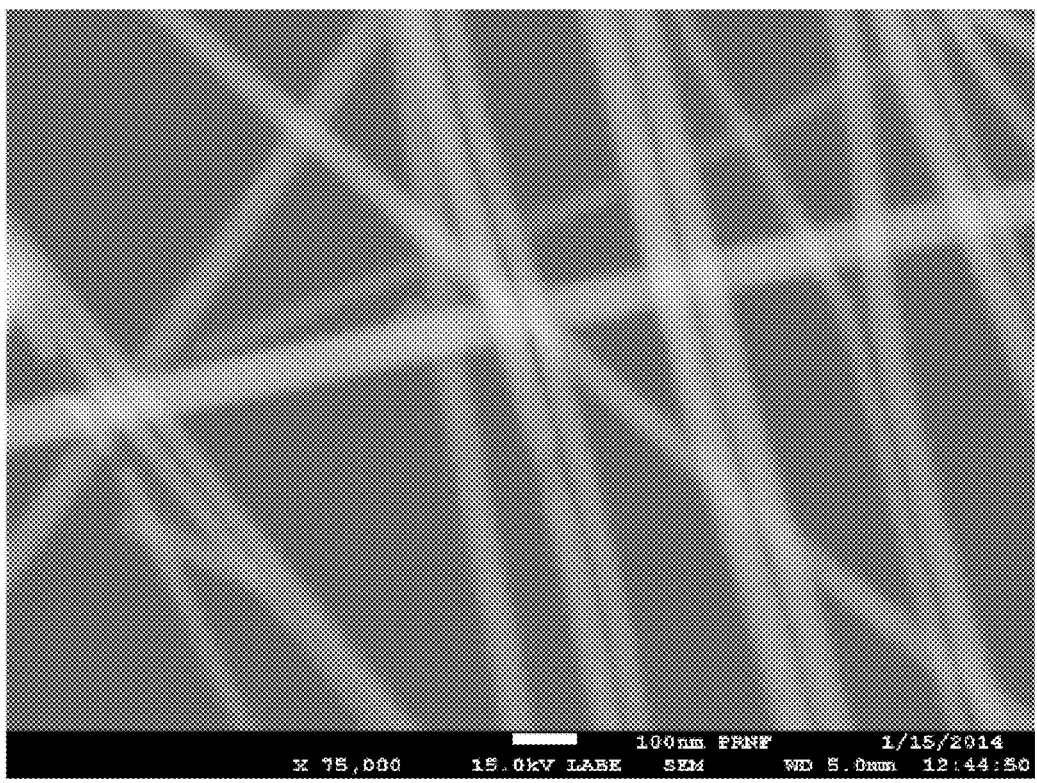
FIG. 10: SEM image of silver nanowires formed by the process of the present invention as illustrated in Example 10.
Figure 11:
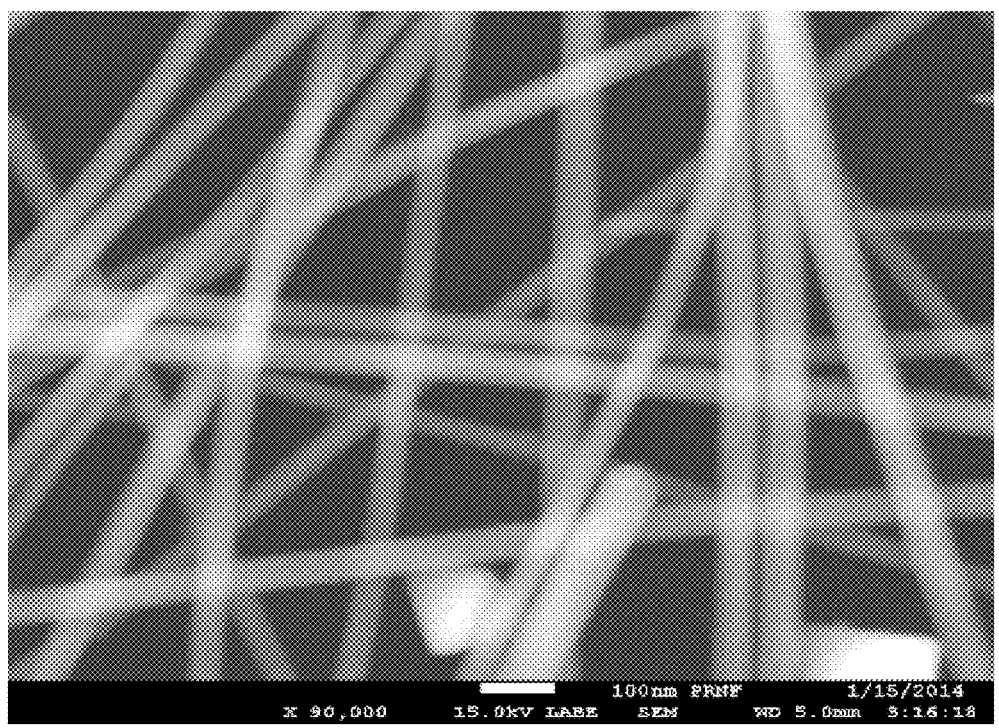
FIG. 11: SEM image of silver nanowires formed by the process of the present invention as illustrated in Example 11.
Figure 12:
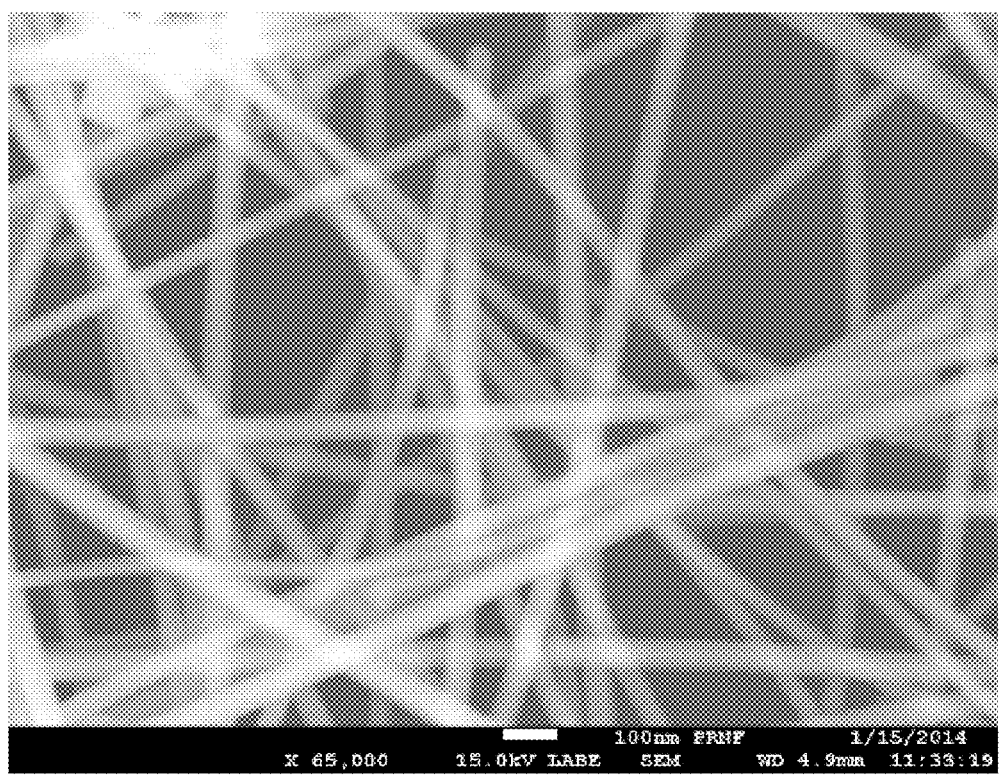
FIG. 12: SEM image of silver nanowires formed by the process of the present invention as illustrated in Example 12.
Figure 13:
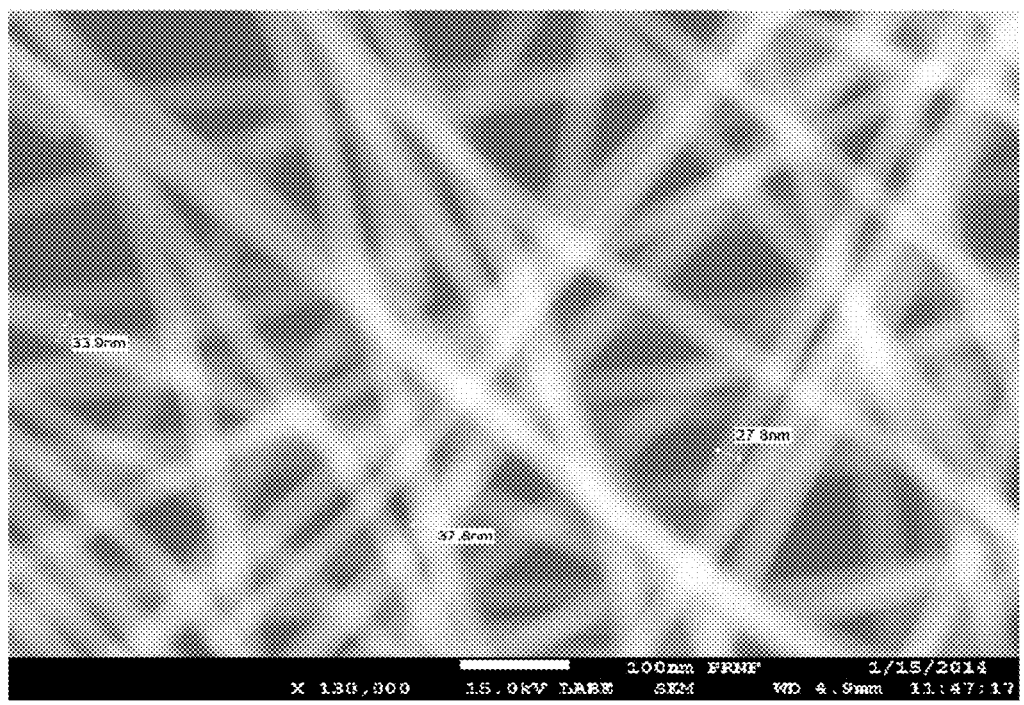
FIG. 13: SEM image of silver nanowires formed by the process of the present invention as illustrated in Example 13.
Figure 14:
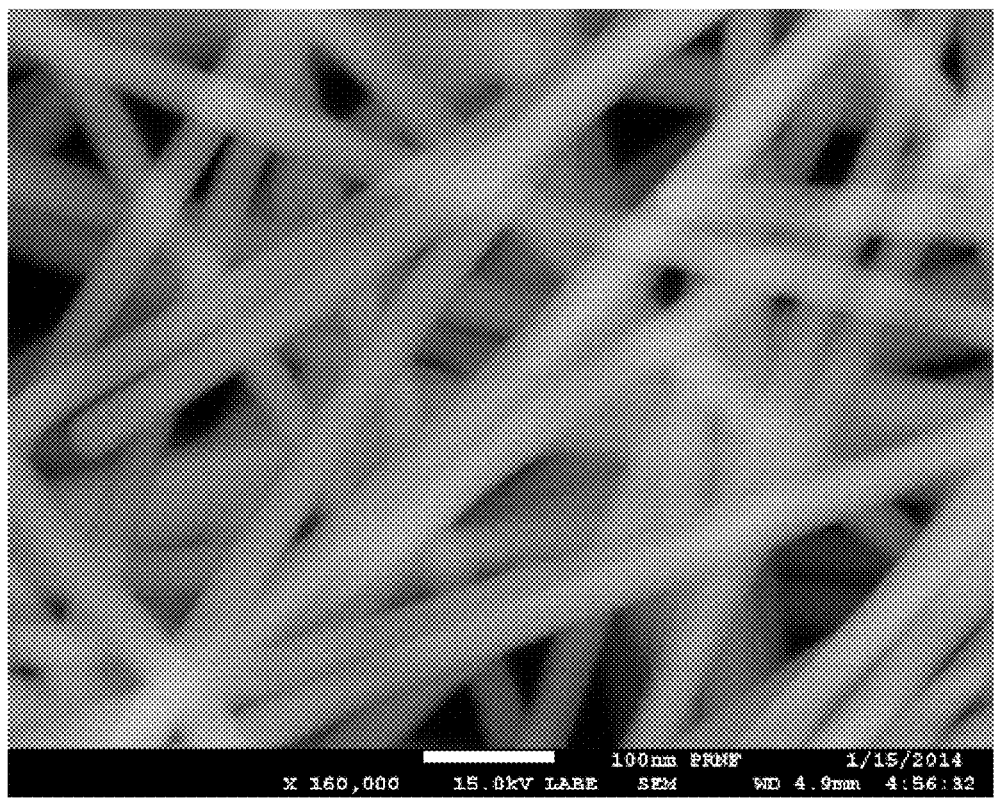
FIG. 14: SEM image of silver nanowires formed by the process of the present invention as illustrated in Example 14.
Figure 15:
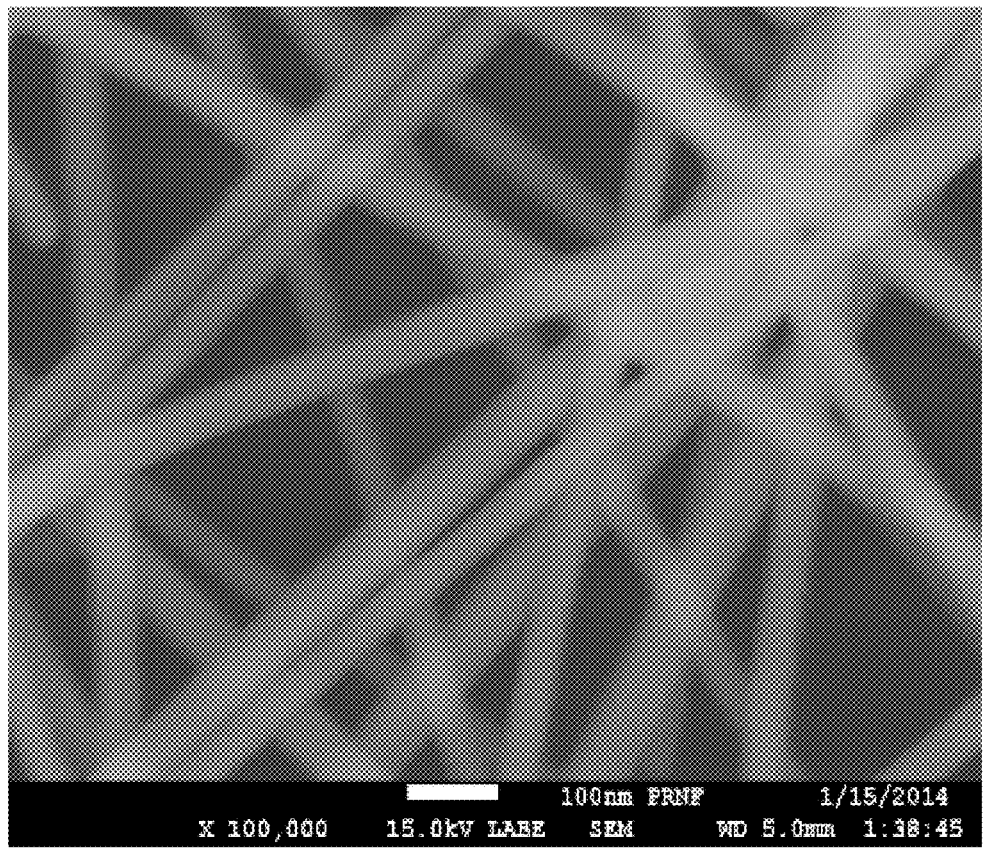
FIG. 15: SEM image of silver nanowires formed by the process of the present invention as illustrated in Example 15.

| Conditions | Ex. 10 | Ex. 11 | Ex. 12 | Ex. 13 | Ex. 14 | Ex. 15 |
| --- | --- | --- | --- | --- | --- | --- |
| Temperature A (° C.) | 170 | 150 | 130 | 130 | 105 | 105 |
| $AgNO_3$ (g) added during feed step | 0.25 | 0.25 | 0.25 | 0.25 | 0.25 | 0.50 |
| Temperature B (° C.) | 170 | 150 | 130 | 105 | 105 | 105 |
| Reaction time (start of feed to quench) | 15 min. | 30 min. | 3 h | 24 h | 24 h | 24 h |
| Avg. diameter | 50 nm | <45 nm | 45 nm | 30 nm | <32 nm | 45 nm |
| Avg. length | 20 μm | 20 μm | 20 μm | 20 μm | 20 μm | 20 μm |
| SEM micrograph | FIG. 10 | FIG. 11 | FIG. 12 | FIG. 13 | FIG. 14 | FIG. 15 |

Example 16

In a large-scale synthesis, a 1-L three-necked flask containing 300 g of ethylene glycol, 0.05 g of $Ca(OH)_2$, 14 mg LiCl, and 5 g p(VP-DADMAN) were heated to 130° C. The temperature was allowed to stabilize for 30 min under nitrogen atmosphere and moderate agitation (100-300 rpm). In the seed step, 60 mg $AgNO_3$ was dissolved in 5 g of ethylene glycol and added to the reaction mixture. Then, in the feed step, 2.5 g of $AgNO_3$ was dissolved in 100 g ethylene glycol and the resulting solution was added drop-wise to the reaction mixture at a rate of 10 mL/minute. After the feed was completed, the temperature of the reactor was lowered to 105° C. and kept constant until the end of the reaction. The reaction was stopped after 24 hours from the start of the feed by quenching the solution in ice.

Figure 16:
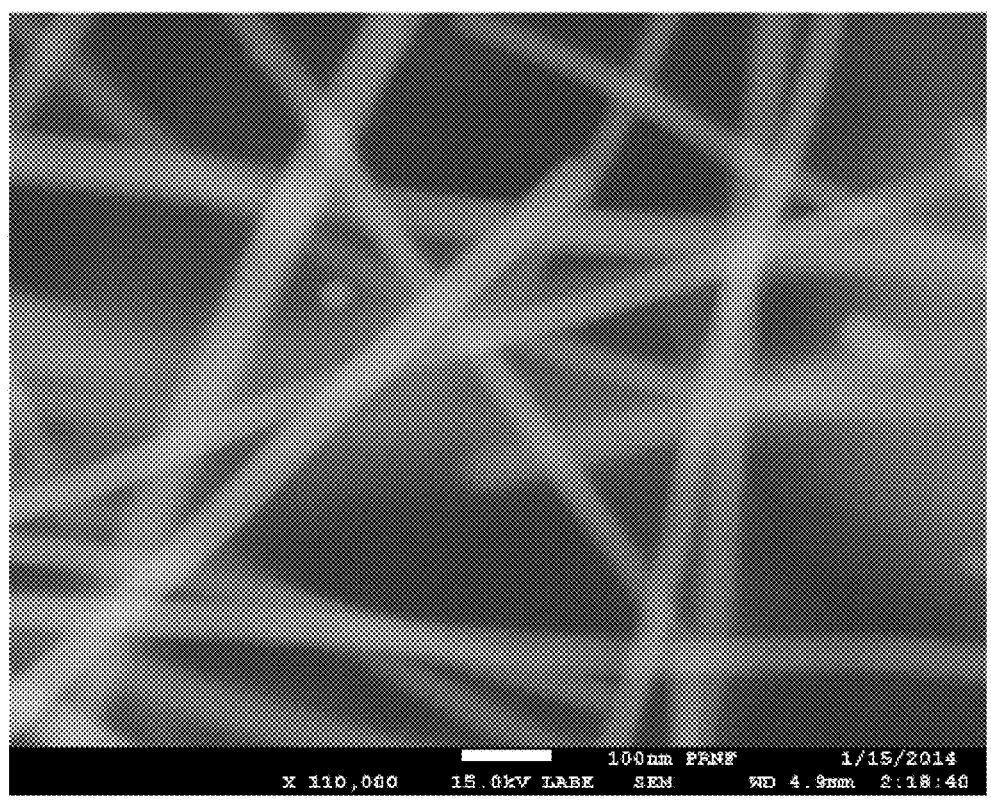
FIG. 16: SEM image of silver nanowires formed by the process of the present invention as illustrated in Example 16.

Silver nanowires having an average diameter of about 38 nm were obtained. FIG. 16 shows an SEM image of the silver nanowires obtained in example 16.

Examples 17-18

A change in the morphology of silver nanowires made was observed when the agitation speed was changed. A decrease in the diameter of the silver nanowires formed was observed with a decrease in agitation speed.

A 125-mL three-necked flask containing 30 g of ethylene glycol, 0.005 g of Ca(OH)$_2$-1.4 mg LiCl and 0.5 g p(VP-DADMAN) was heated to 130° C. The temperature was allowed to stabilize for 30 min under nitrogen atmosphere and moderate agitation (100-300 rpm). In the subsequent seed step, 6 mg AgNO$_3$ was dissolved in 0.5 g of ethylene glycol and the resulting solution was added to the reaction mixture. In the feed step, 0.25 g of AgNO$_3$ was dissolved in 10 g ethylene glycol and added drop-wise to the reaction mixture at a rate of 1.5 mL/minute. After the feed was completed, the agitation was stopped and no agitation was further used. The temperature was maintained at 130° C. (Example 17) or adjusted to 105° C. (Example 18). The reaction was stopped after 2 hours from the start of the feed by quenching the solution in ice. The reaction conditions and characteristics of the nanowires formed in Examples 17 and 18 are summarized in Table 2 below.

TABLE 2

Figure 17:
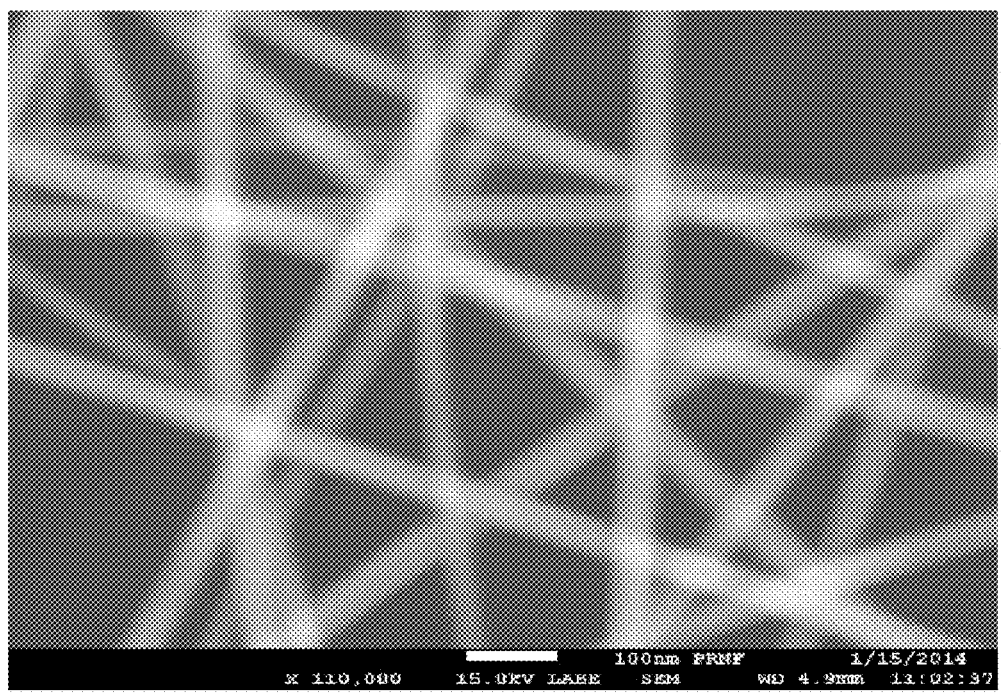
FIG. 17: SEM image of silver nanowires formed by the process of the present invention as illustrated in Example 17.
Figure 18:
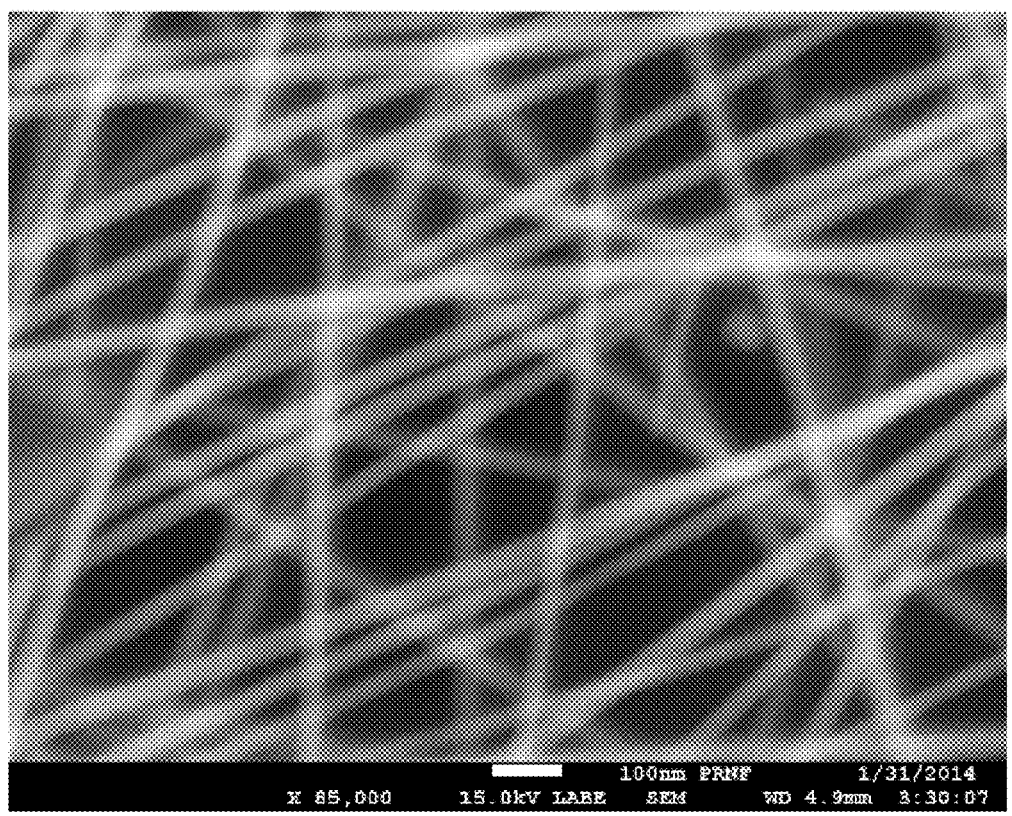
FIG. 18: SEM image of silver nanowires formed by the process of the present invention as illustrated in Example 18.

| Conditions | Ex. 17 | Ex. 18 |
|---|---|---|
| Temperature after feed (° C.) | 130 | 105 |
| Agitation after feed | none | none |
| Avg. diameter | 38 nm | 30 nm |
| Avg. length | 20 µm | 20 µm |
| SEM micrograph | FIG. 17 | FIG. 18 |

Figure 19:
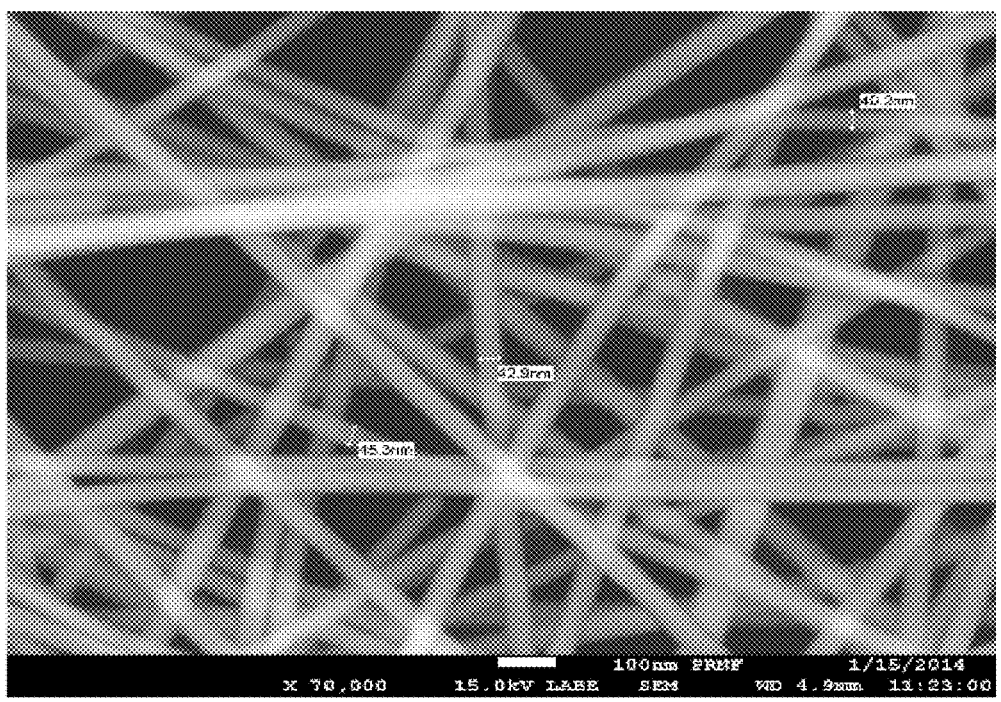
FIG. 19: SEM image of silver nanowires formed by a process that includes agitation.

Silver nanowires with average diameter of about 38 nm and length of about 20 µm were obtained in Example 17 and are shown in FIG. 17. Silver nanowires with average diameter of about 30 nm and length of about 20 µm were obtained in Example 18 and are shown in FIG. 18. Silver nanowires having larger average diameter of about 46 nm were obtained when the agitation speed was not stopped (FIG. 19).

Example 19

A 125-mL three-necked flask containing 10 g of ethylene glycol and 0.005 g of Ca(OH)$_2$ was heated to 180° C. The temperature was allowed to stabilize for 30 min under nitrogen atmosphere and moderate agitation (100-300 rpm). In the subsequent seed step, 0.25 g AgNO$_3$ was dissolved in 10 g of ethylene glycol and the resulting solution was added to the reaction mixture (5 seconds). In the feed step, 0.5 g p(VP-DADMAN) and 0.01 g KBr were dissolved in 10 g ethylene glycol and added drop-wise to the reaction mixture at a rate of 1.5 mL/minute. The temperature was maintained at 180° C. The reaction was stopped after 30 minutes from the start of the feed by quenching the solution in ice.

Figure 20:
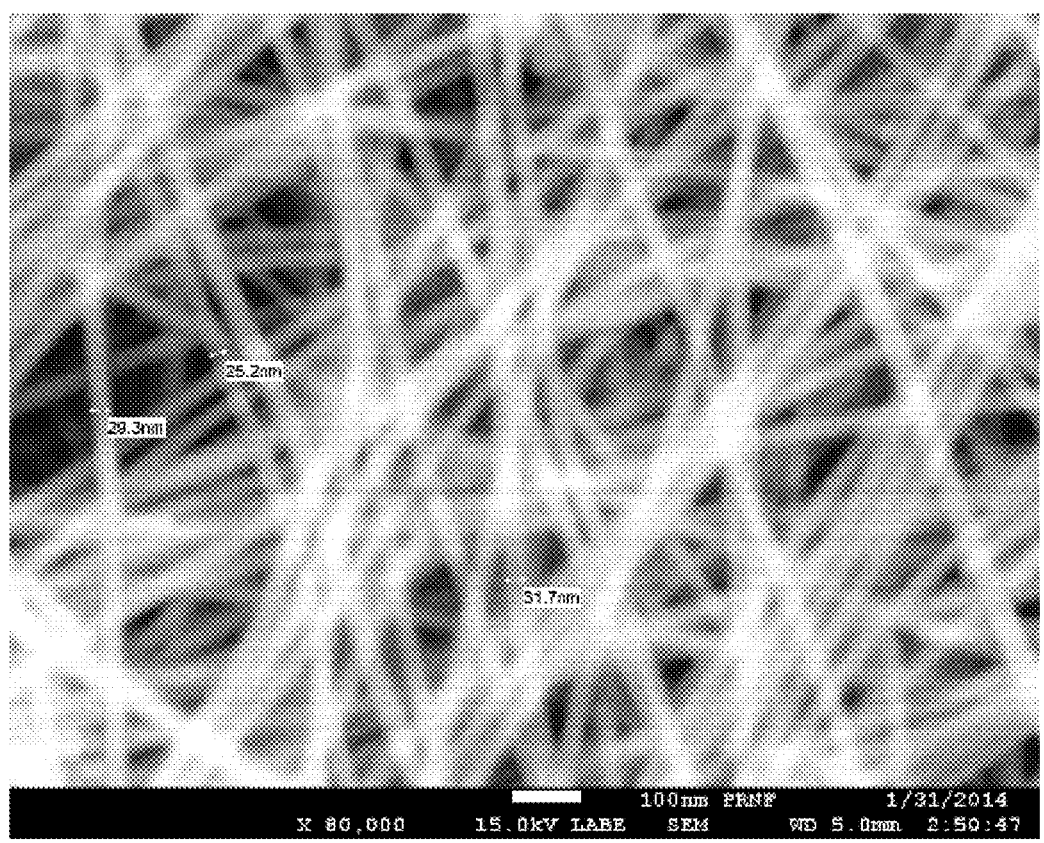
FIG. 20: SEM image of silver nanowires formed by the process of the present invention as illustrated in Example 19.

Silver nanowires with average diameter of about 30 nm and average length of about 20 µm were obtained, as shown in FIG. 20.

Example 20

In a large-scale synthesis, a 1-L three-necked flask containing 300 g of ethylene glycol and 0.05 g of Ca(OH)$_2$ was heated to 180° C. The temperature was allowed to stabilize for 30 min under nitrogen atmosphere and moderate agitation (100-300 rpm). In the subsequent seed step, 2.5 g AgNO$_3$ was dissolved in 30 g of ethylene glycol and the resulting solution was added to the reaction mixture (5 seconds). In the feed step, 5 g p(VP-DADMAN) and 0.10 g KBr were dissolved in 100 g ethylene glycol and added drop-wise to the reaction mixture at a rate of 10 mL/minute. The temperature was maintained at 180° C. The reaction was stopped after 30 minutes from the start of the feed by quenching the solution in ice.

Figure 21:
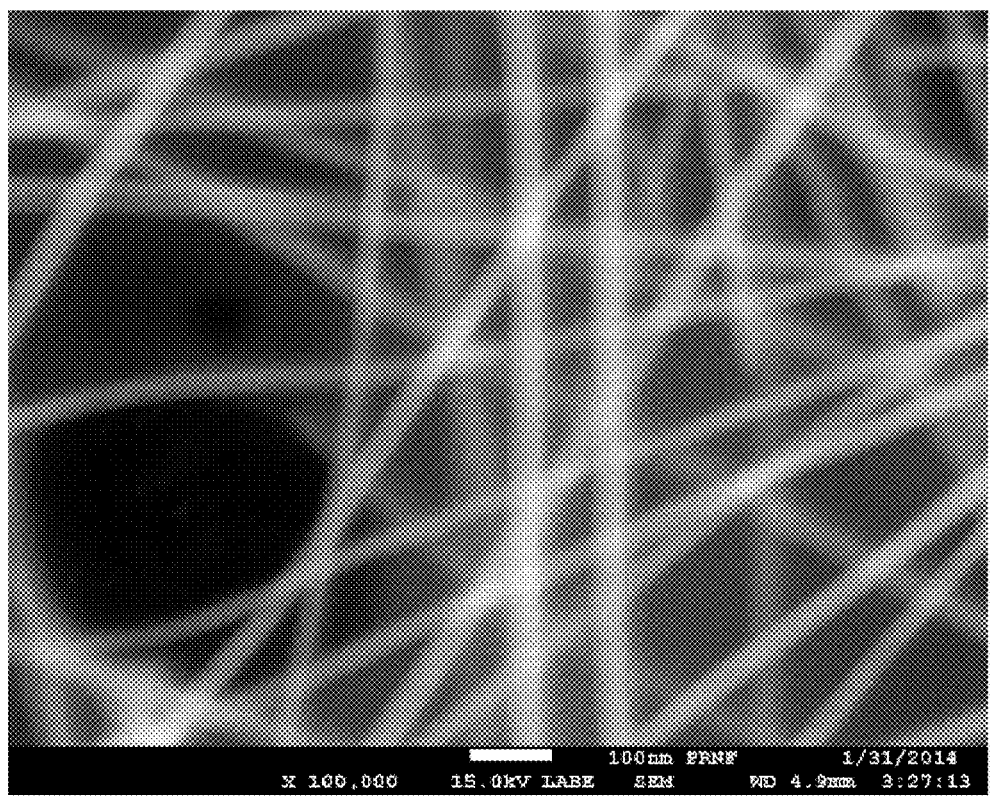
FIG. 21: SEM image of silver nanowires formed by the process of the present invention as illustrated in Example 20.

Silver nanowires with average diameter of about 35 nm and average length of about 20 µm were obtained, as shown in FIG. 21.

Examples 21-24

In each of Examples 21-24, a suitable three-necked flask charged with specified amounts of ethylene glycol (EG), bicine, potassium bromide (KBr), silver nitrate (AgNO$_3$) and p(VP-DADMAN) was heated to 180° C. under N$_2$ atmosphere and moderate agitation (100-200 rpm). The reaction was stopped 10 min after reaching the temperature of 180° C. The results of Examples 21-24 are summarized in Table 3 below.

TABLE 3

Figure 22:
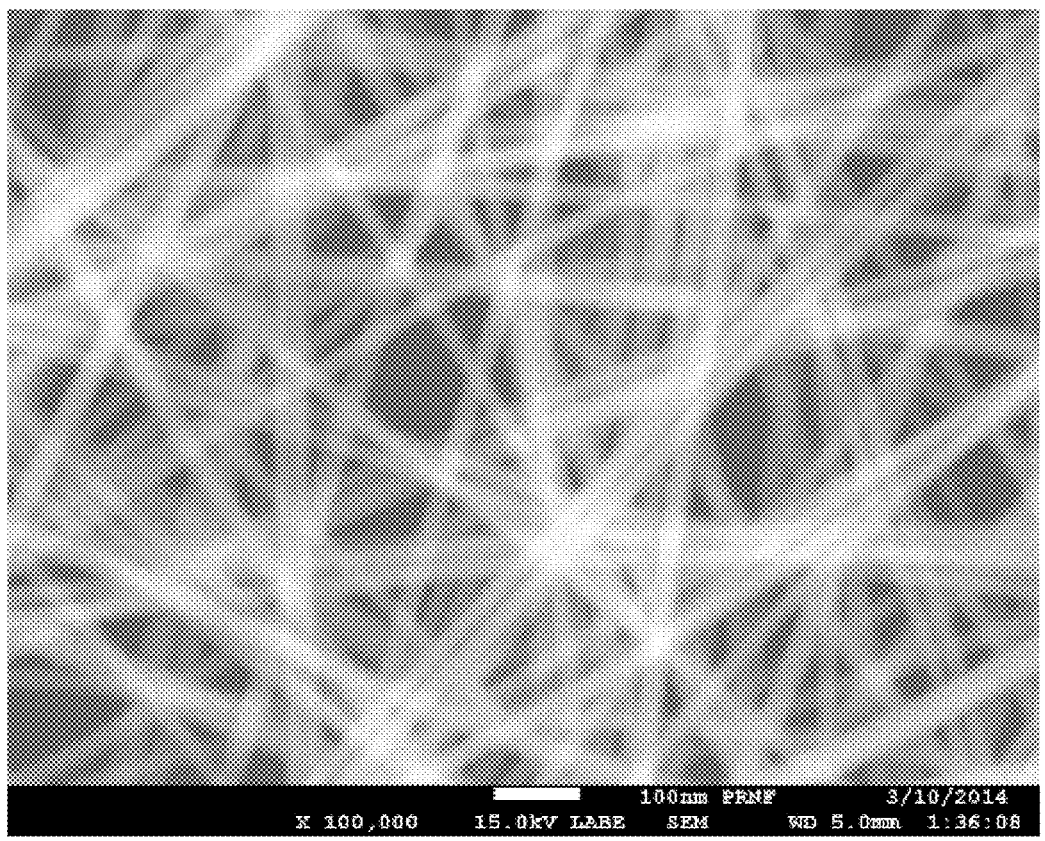
FIG. 22: SEM image of silver nanowires formed by the process of the present invention as illustrated in Example 21.
Figure 23:
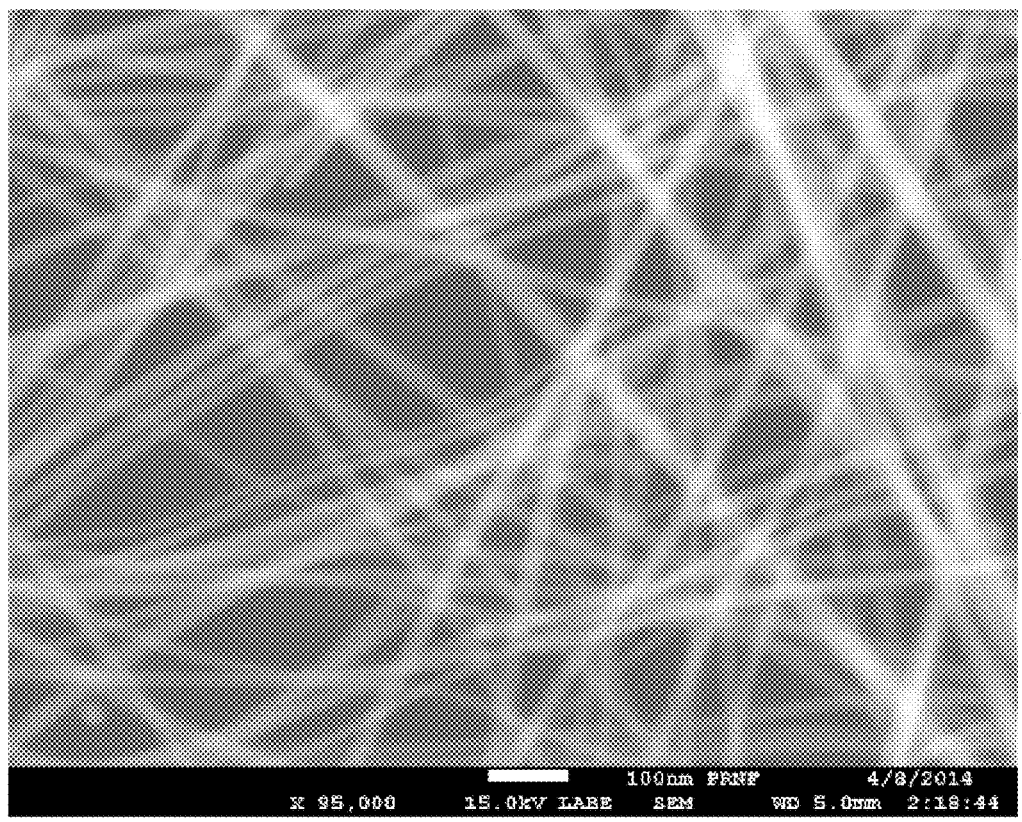
FIG. 23: SEM image of silver nanowires formed by the process of the present invention as illustrated in Example 22.
Figure 24:
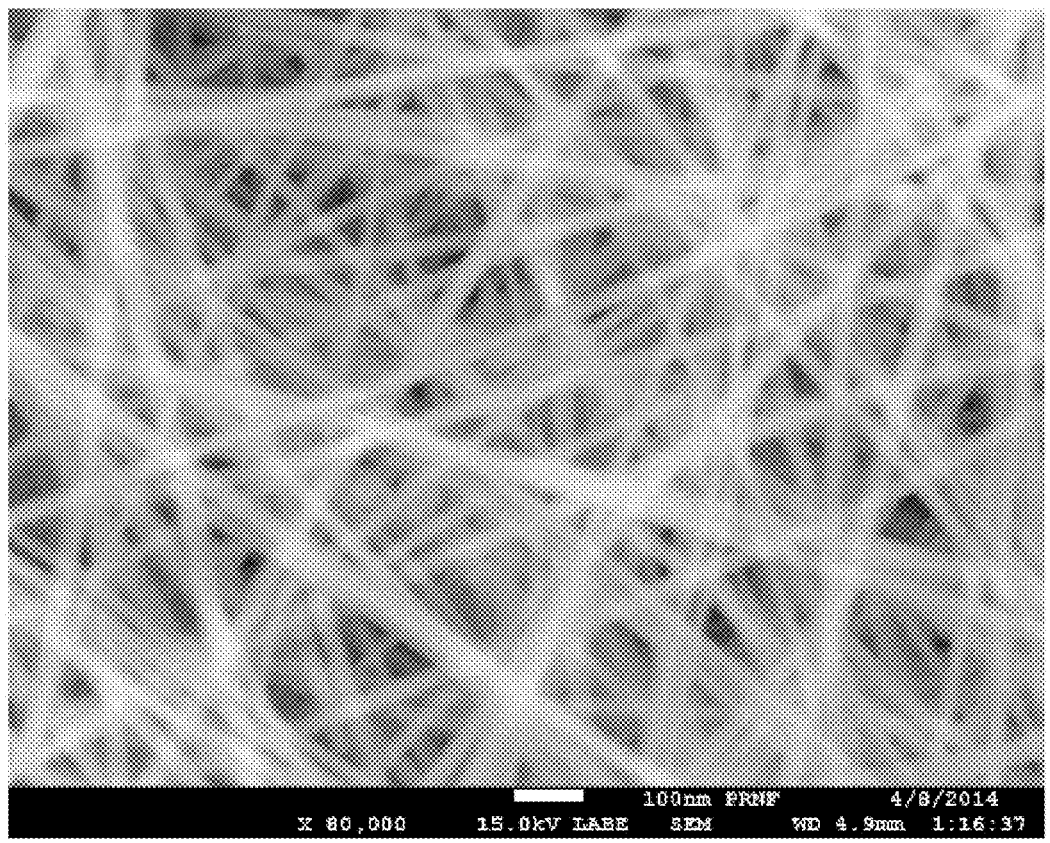
FIG. 24: SEM image of silver nanowires formed by the process of the present invention as illustrated in Example 23.
Figure 25:
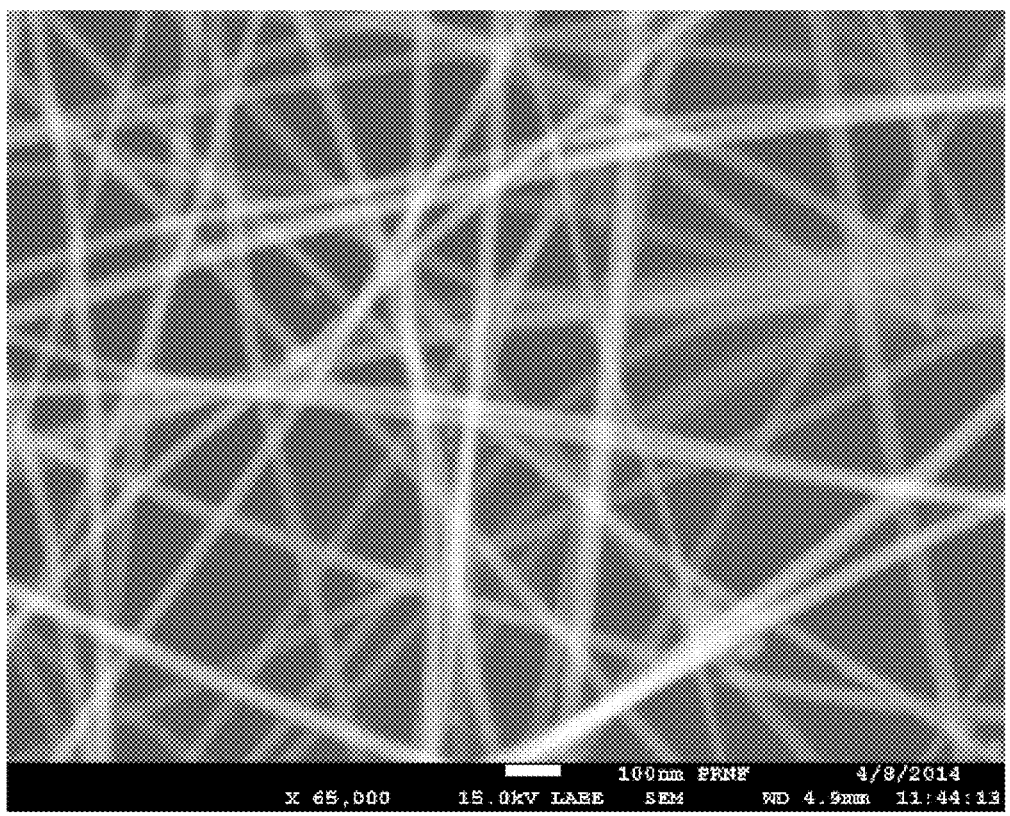
FIG. 25: SEM image of silver nanowires formed by the process of the present invention as illustrated in Example 24.

| Reagents | Ex. 21 | Ex. 22 | Ex. 23 | Ex. 24 |
|---|---|---|---|---|
| EG | 300 g | 650 g | 300 g (recycled) | 3000 kg |
| Bicine | 0.05 g | 0.1 g | 0.05 g | 0.5 g |
| KBr | 0.05 g | 0.1 g | 0.05 g | 0.5 g |
| AgNO$_3$ | 1.5 g | 5 g | 1.5 g | 15 g |
| p(VP-DADMAN) | 4 g | 11 g | 4 g | 40 g |
| Avg. diameter | 20 nm | 25 nm | 28 nm | 26 nm |
| Avg. length | 50 µm | 40 µm | 40 µm | 40 µm |
| SEM micrograph | FIG. 22 | FIG. 23 | FIG. 24 | FIG. 25 |

Example 25

Electrically conductive coatings were prepared and analyzed.

The glass substrates used for coating were cleaned using soap and deionized water. Samples each containing silver nanowires prepared according to Examples 21-24 were dispersed in deionized water, with the exception that the samples containing silver nanowires made according to Example 22 were dispersed in 1:1 deionized water/isopropanol. Then, all of the samples were further diluted with isopropanol. The dispersions were coated on clean glass substrate by spin-coating at 1500-2000 rpm for 20 sec (spin-coater KW-4B from Chemat Technology). Then, the coated substrate was dried in an oven for a short time (about 1 min). After drying, the haze and transparency were measured using a hazemeter (BYK Haze-gard plus) and the sheet resistance was measured with a JANDEL four point probe system (Model RM3-AR).

Figure 26:
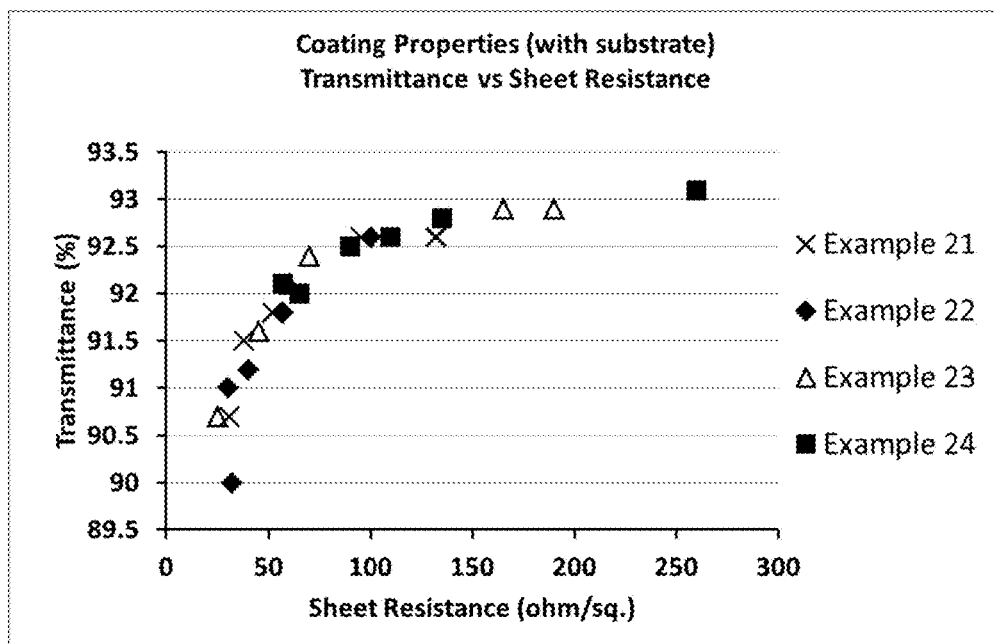
FIG. 26: Graph of transmittance vs. sheet resistance of a coating comprising the silver nanowires formed by the process of the present invention, as illustrated in Examples 21-24, including the substrate.
Figure 27:
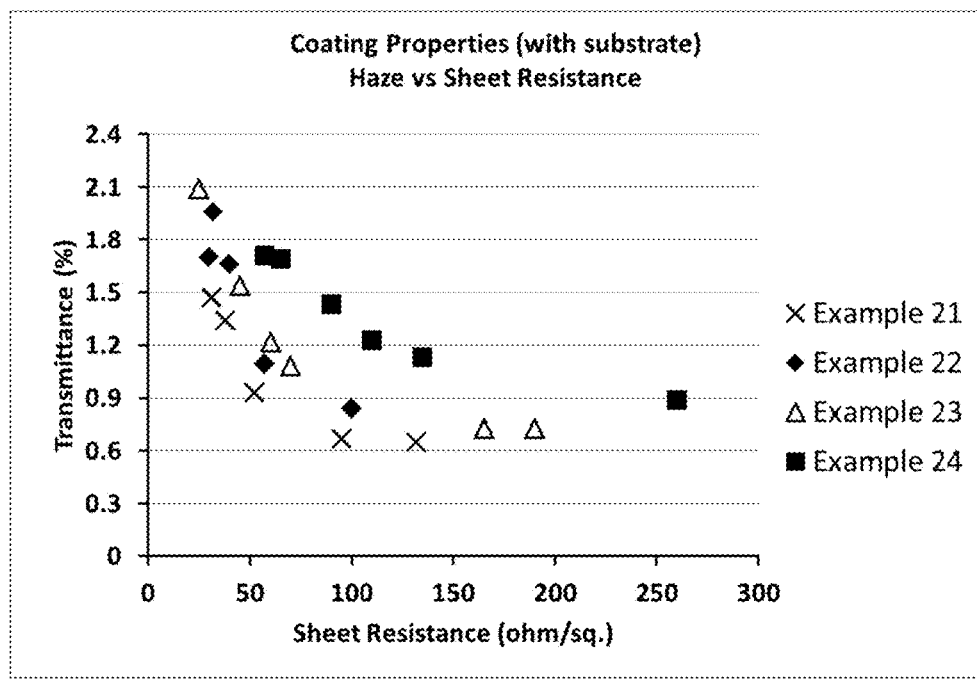
FIG. 27: Graph of haze vs. sheet resistance of a coating comprising the silver nanowires formed by the process of the present invention, as illustrated in Examples 21-24, including the substrate.

The transmittance versus sheet resistance (in QM and haze versus sheet resistance of the electrically conductive coatings comprising the silver nanowires prepared in Examples 21-24, including the glass substrates, are shown in FIG. 26 and FIG. 27.

Figure 28:
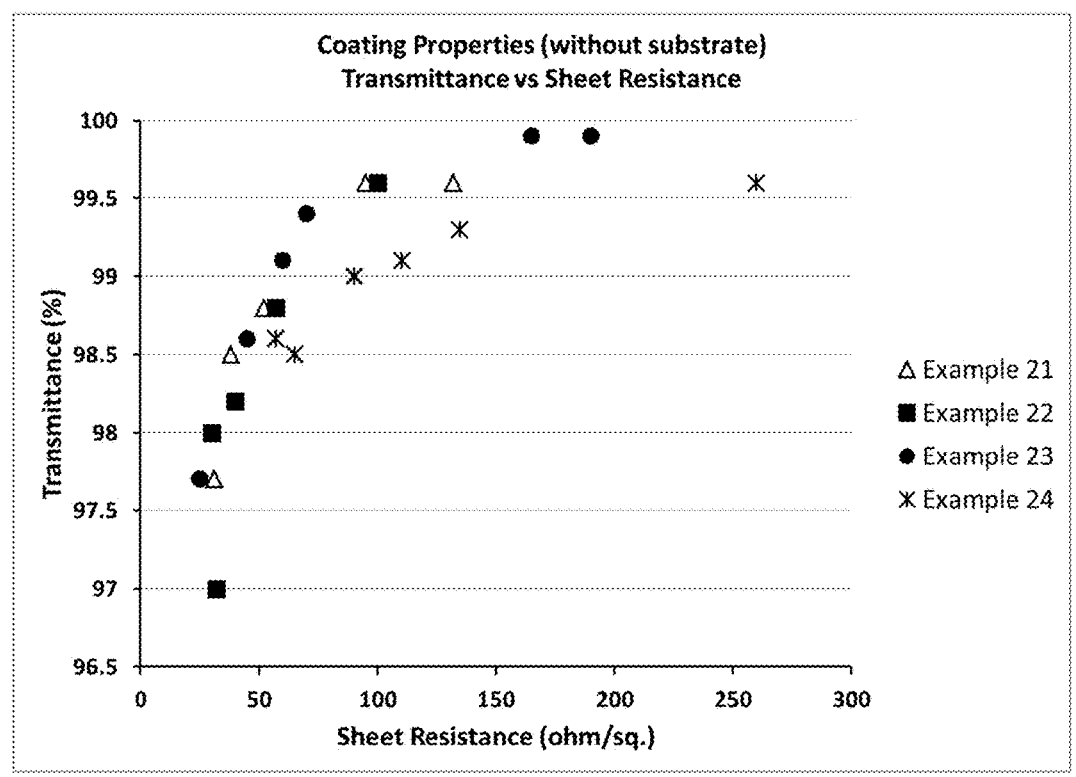
FIG. 28: Graph of transmittance vs. sheet resistance of a coating comprising the silver nanowires formed by the process of the present invention, as illustrated in Examples 21-24, with the substrate excluded.
Figure 29:
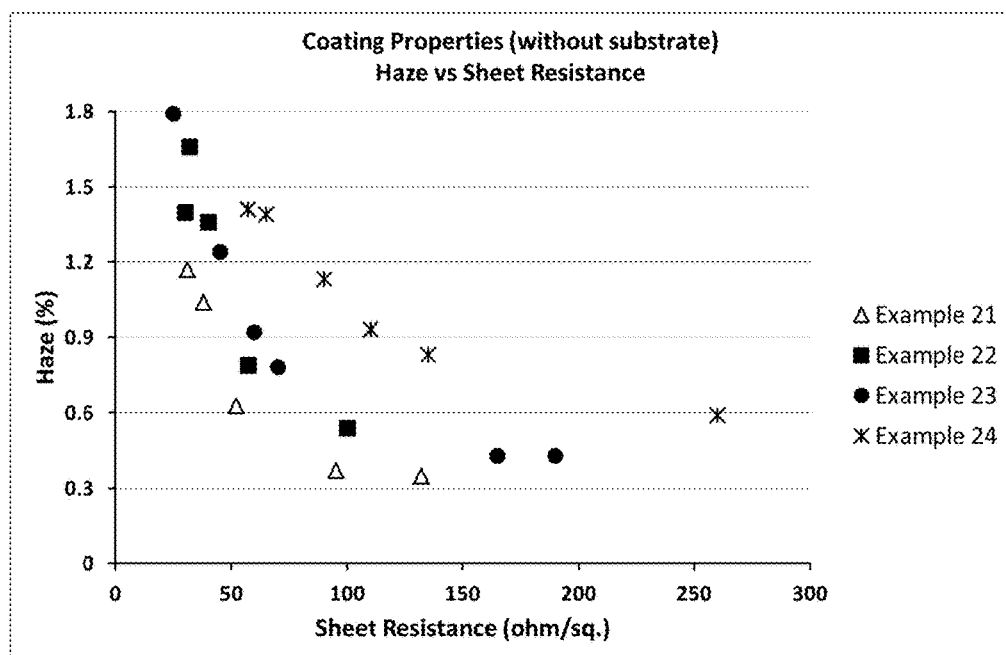
FIG. 29: Graph of haze vs. sheet resistance of a coating comprising the silver nanowires formed by the process of the present invention, as illustrated in Examples 21-24, with the substrate excluded.

The transmittance versus sheet resistance and haze versus sheet resistance of the electrically conductive coatings with transmittance and haze of the glass substrates subtracted are shown in FIG. 28 and FIG. 29.

In general, a larger concentration of silver nanowires in the dispersion resulted in coatings having a lower sheet resistance, but also lower transparency and higher haze.

What is claimed is:

1. A process for making silver nanostructures, the process comprising reacting at least one polyol and at least one silver compound that is capable of producing silver metal when reduced, in the presence of:
   (a) a source of chloride or bromide ions, and
   (b) at least one copolymer that comprises:
      (i) one or more first constitutional repeating units that each independently comprise at least one pendant saturated or unsaturated, five-, six-, or seven-membered, acylamino- or diacylamino-containing heterocylic ring moiety per constitutional repeating unit, and
      (ii) one or more second constitutional repeating units, each of which independently differs from the one or more first constitutional repeating units, wherein one or more of the second constitutional repeating units each comprise at least one pendant diallyldimethylammonium moiety,
   and has a molecular weight of greater than or equal to about 500 grams per mole; and
   (c) at least one acid scavenger, wherein the at least one acid scavenger comprises an alkaline earth metal hydroxide, a source of sulfide ions, a buffering agent, or a mixture thereof.

2. The process of claim 1, wherein the first constitutional repeating units of the copolymer each independently comprise a pyrrolidonyl moiety or a pyrrolidinedionyl moiety.

3. The process of claim 1, wherein the copolymer is a random copolymer made by free radical polymerization of a monomer mixture comprising from about 80 to less than 100 parts by weight of vinyl pyrrolidone and from greater than 0 to about 20 parts by weight of a diallyldimethylammonium salt.

4. The process of claim 1, wherein the at least one silver compound comprises silver nitrate, the at least one polyol comprises ethylene glycol or glycerol, the at least one acid scavenger comprises $Na_2S$, $Ca(OH)_2$, bicine, or a mixture thereof, the total amount of silver nitrate added to the reaction mixture is from $1.5 \times 10^{-3}$ mole to about 1 mole silver nitrate per Liter of reaction mixture, and the reaction is conducted in the presence of, based on the weight of the reaction mixture, from about 0.01 wt % to about 50 wt % of the copolymer.

5. The process of claim 1, wherein the acid scavenger comprises an alkaline earth metal hydroxide, a source of sulfide ions, a buffering agent, or a mixture thereof.

6. The process of claim 5, wherein the acid scavenger comprises an alkaline earth metal hydroxide, a source of sulfide ions, or a mixture thereof.

7. The process of claim 6, wherein the acid scavenger comprises $Ca(OH)_2$ and $Na_2S$.

8. The process of claim 5, wherein the acid scavenger comprises a buffering agent.

9. A process for making silver nanostructures, the process comprising:
   (1) heating to a first temperature a mixture comprising
      (a) at least one polyol;
      (b) a source of chloride or bromide ions;
      (c) at least one copolymer that comprises:
         (i) one or more first constitutional repeating units that each independently comprise at least one pendant saturated or unsaturated, five-, six-, or seven-membered, acylamino- or diacylamino-containing heterocylic ring moiety per constitutional repeating unit, and
         (ii) one or more second constitutional repeating units, each of which independently differs from the one or more first constitutional repeating units, wherein one or more of the second constitutional repeating units each comprise at least one pendant diallyldimethylammonium moiety,
      and has a molecular weight of greater than or equal to about 500 grams per mole, and
   (2) adding to the mixture of step (1) at least one silver compound that is capable of producing silver metal when reduced; and
   (3) heating to a second temperature the mixture obtained in step (2);
thereby making silver nanostructures.

10. The process of claim 9, wherein the mixture of step (1) further comprises at least one acid scavenger, wherein the at least one acid scavenger comprises an alkaline earth metal hydroxide, a source of sulfide ions, a buffering agent, or a mixture thereof.

11. The process of claim 9, wherein the copolymer is a random copolymer made by free radical polymerization of a monomer mixture comprising from about 80 to less than 100 parts by weight of vinyl pyrrolidone and from greater than 0 to about 20 parts by weight of a diallyldimethylammonium salt.

12. The process of claim 10, wherein the at least one silver compound comprises silver nitrate, the at least one polyol comprises ethylene glycol or glycerol, the at least one acid scavenger comprises $Na_2S$, $Ca(OH)_2$, bicine, or a mixture thereof, the total amount of silver nitrate added to the reaction mixture is from $1.5 \times 10^{-3}$ mole to about 1 mole silver nitrate per Liter of reaction mixture, and the reaction is conducted in the presence of, based on the weight of the reaction mixture, from about 0.01 wt % to about 50 wt % of the copolymer.

13. The process of claim 10, wherein the acid scavenger comprises an alkaline earth metal hydroxide, a source of sulfide ions, a buffering agent, or a mixture thereof.

14. The process of claim 10, wherein the acid scavenger comprises an alkaline earth metal hydroxide, a source of sulfide ions, or a mixture thereof.

15. The process of claim 14, wherein the acid scavenger comprises $Ca(OH)_2$ and $Na_2S$.

16. The process of claim 9, wherein the first temperature is from about 130° C. to about 155° C.

17. The process of claim 9, wherein the second temperature is from about 160° C. to about 185° C.

18. The process of claim 9, wherein the first constitutional repeating units of the copolymer each independently comprise a pyrrolidonyl moiety or a pyrrolidinedionyl moiety.

* * * * *